US010834575B2

United States Patent
Novlan et al.

(10) Patent No.: US 10,834,575 B2
(45) Date of Patent: Nov. 10, 2020

(54) INITIAL ACCESS CONFIGURATION FOR COEXISTENCE OF MULTIPLE WIRELESS COMMUNICATION SYSTEMS

(71) Applicant: AT&T Intellectual Property I, L.P., Atlanta, GA (US)

(72) Inventors: Thomas Novlan, Austin, TX (US); Ralf Bendlin, Cedar Park, TX (US); Arunabha Ghosh, Austin, TX (US); Xiaoyi Wang, Austin, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

(21) Appl. No.: 15/625,787

(22) Filed: Jun. 16, 2017

(65) Prior Publication Data
US 2018/0367985 A1    Dec. 20, 2018

(51) Int. Cl.
*H04W 8/22*    (2009.01)
*H04W 16/14*    (2009.01)
(Continued)

(52) U.S. Cl.
CPC ............ *H04W 8/22* (2013.01); *H04W 16/14* (2013.01); *H04W 48/16* (2013.01);
(Continued)

(58) Field of Classification Search
CPC .................................................. H04W 48/16
See application file for complete search history.

(56) References Cited

U.S. PATENT DOCUMENTS

| 8,451,776 | B2 | 5/2013 | Dayal et al. |
| 8,908,656 | B2 | 12/2014 | Sadek et al. |

(Continued)

FOREIGN PATENT DOCUMENTS

| WO | 2016033049 A1 | 3/2016 |
| WO | 2016122756 A1 | 8/2016 |

(Continued)

OTHER PUBLICATIONS

3GPP TS 36.331 version 13.0.0, Jan. 2016, pp. 146, 151 (Year: 2016).*
Irnich et al., "Spectrum Sharing Scenarios and Resulting Technical Requirements for 5G Systems," 24th International Symposium on Personal, Indoor and Mobile Radio Communications (PIMRC Workshops), 2013, IEEE, 6 pages.

(Continued)

*Primary Examiner* — Un C Cho
*Assistant Examiner* — Yu-Wen Chang
(74) *Attorney, Agent, or Firm* — Amin, Turocy & Watson, LLP

(57) ABSTRACT

Systems and techniques and machine-readable storage media for initial access configuration for coexistence of multiple wireless communication systems are provided. In one embodiment, a method comprises: determining, by a base station device comprising a processor, a capability of a mobile device configured to operate according to a first communication protocol; and selecting, by the base station device, a numerology of numerologies for transmission of information from the base station device in a subframe of a frame, wherein the frame is associated with communications in accordance with the first communication protocol, wherein the selecting is based on the capability, wherein the numerologies are distinct combinations of frequency subcarrier spacing for synchronization signal blocks and placement locations of the synchronization signal blocks, and wherein the synchronization signal blocks are provided for initial access to a second communication protocol.

20 Claims, 20 Drawing Sheets

(51) Int. Cl.
*H04W 48/16* (2009.01)
*H04W 56/00* (2009.01)
*H04W 72/04* (2009.01)
*H04W 88/06* (2009.01)

(52) U.S. Cl.
CPC ...... *H04W 56/0005* (2013.01); *H04W 72/048* (2013.01); *H04W 88/06* (2013.01)

(56) References Cited

U.S. PATENT DOCUMENTS

| | | |
|---|---|---|
| 9,055,486 B2 | 6/2015 | Farhadi |
| 9,445,425 B2 | 9/2016 | Chapman et al. |
| 9,451,612 B2 | 9/2016 | Salem et al. |
| 2009/0185632 A1 | 7/2009 | Cai et al. |
| 2011/0077015 A1 | 3/2011 | Saily et al. |
| 2013/0165134 A1 | 6/2013 | Touag et al. |
| 2015/0257012 A1 | 9/2015 | Zhang |
| 2016/0127098 A1 | 5/2016 | Ng et al. |
| 2016/0212624 A1 | 7/2016 | Mueck et al. |
| 2016/0249224 A1 | 8/2016 | Prasad et al. |
| 2016/0262100 A1* | 9/2016 | Larsson ............ H04W 52/0229 |
| 2017/0054536 A1 | 2/2017 | Kazmi et al. |
| 2017/0111930 A1* | 4/2017 | Rajagopal ............ H04B 7/0626 |
| 2017/0134203 A1 | 5/2017 | Zhu et al. |
| 2017/0257774 A1 | 9/2017 | Ghosh et al. |
| 2018/0070369 A1* | 3/2018 | Papasakellariou ..... H04B 7/024 |
| 2018/0110019 A1* | 4/2018 | Ly ....................... H04W 56/001 |
| 2018/0152964 A1* | 5/2018 | Sun .................... H04W 72/1273 |
| 2018/0234930 A1* | 8/2018 | Chen ..................... H04W 48/12 |
| 2018/0248642 A1* | 8/2018 | Si ........................ H04J 11/0079 |

FOREIGN PATENT DOCUMENTS

| | | |
|---|---|---|
| WO | 2016175900 A1 | 11/2016 |
| WO | 2016182634 A1 | 11/2016 |
| WO | 2016195751 A1 | 12/2016 |
| WO | 2017052517 A1 | 3/2017 |
| WO | 2017071574 A1 | 5/2017 |
| WO | 2017117340 A1 | 7/2017 |

OTHER PUBLICATIONS

Fellah, "Analyst Angle: The Convergence Towards Spectrum Sharing," Mar. 22, 2017, 6 pages. http://www.rcrwireless.com/20170322/wireless/analyst-angle-spectrumsharing-tag10'.

Andrews et al., "What Will 5G Be?" IEEE Journal on Selected Areas in Communications, 2014, pp. 1065-1082, vol. 32, No. 6, IEEE, 17 pages.

Osseiran, et al., "Scenarios for the 5G Mobile and Wireless Communications: the Vision of the METIS Project," IEEE Communications Magazine, 2014, vol. 52, No. 5, IEEE, 20 pages.

International Search Report and Written Opinion dated Aug. 14, 2018 for PCT Application No. PCT/US2018/032609, 17 pages.

"3rd Generation Partnership Project; Technical Specification Group Radio Access Network; Study on New Radio (NR) Access Technology; Physical Layer Aspects (Release 14)" 3GPP Draft; 38802-e00, Mar. 21, 2017 3rd Generation Partnership Project (3GPP), Mobile Competence Centre ; 650, route des Lucioles ; F-06921 Sophia-Antipolis Cedex ; France. [http://www.3gpp.org/ftp/tsg_ran/WG1_RL1/DRAFT/MCC clean-up versions no change marks/] Mar. 21, 2017. 143 pages.

Huawei, et al. "Coexistence of NR DL and LTE" 3GPP Draft; R1-1703559 Coexistence of NR DL and LTE_r1, Feb. 15, 2017 3rd Generation Partnership Project (3GPP), Mobile Competence Centre; 650, route des Lucioles ; F-06921 Sophia-Antipolis Cedex; France. [http://www.3gpp.org/ftp/tsg/ran/WG1_RL1/TSGR1_88/Docs/] Feb. 2017. 7 pages.

ETRI. "NR SS block and burst set composition" 3GPP Draft; R1-1708091 NR SS block and burst set composition—final, May 14, 2017 3rd Generation Partnership Project (3GPP), Mobile Competence Centre ; 650, route des Lucioles ; F-06921 Sophia-Antipolis Cedex ; France. [http://www.3gpp.org/ftp/Meetings_3GPP_SYNC/RAN1/Docs/] May 2017. 6 pages.

Samsung. "LTE-NR Co-existence" 3GPP Draft; R2-1701593_NR Co-existence, Feb. 12, 2017 3rd Generation Partnership Project (3GPP), Mobile Competence Centre ; 650, route des Lucioles ; F-06921 Sophia-Antipolis Cedex ; France. [http://www.3gpp.org/ftp/Meetings_3GPP_SYNC/RAN2/Docs/] Feb. 2017. 5 pages.

International Preliminary Report on Patentability received for PCT Application Serial No. PCT/US2018/032609 dated Dec. 26, 2019, 09 pages.

* cited by examiner

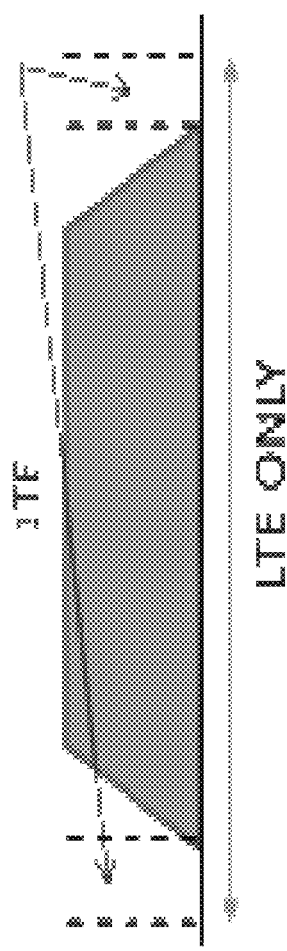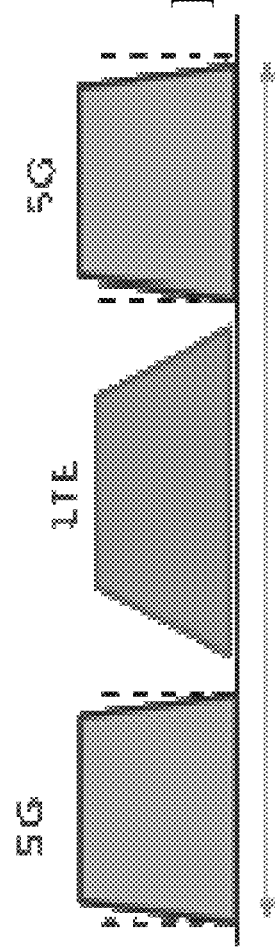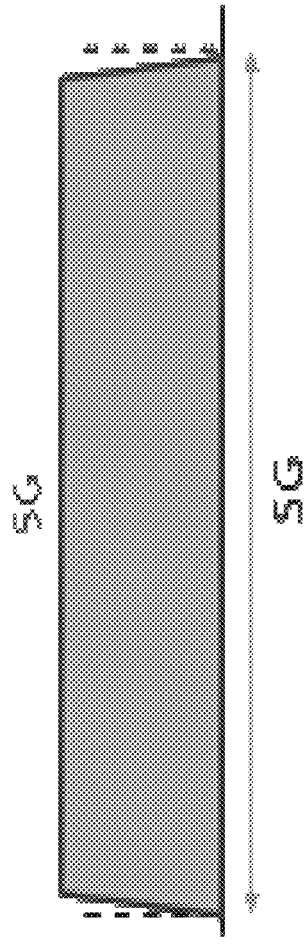

400

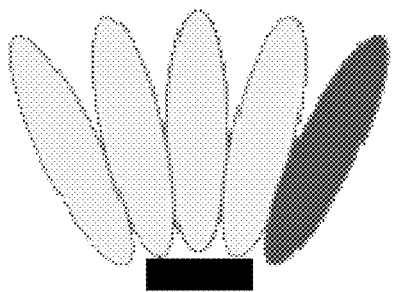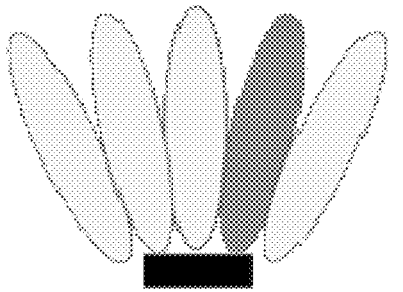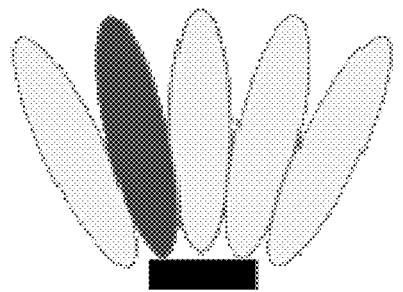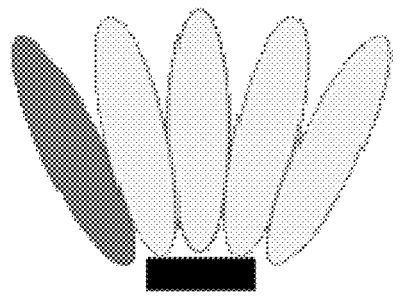
FIG. 5

| Scenario | eNB assumptions | LTE UE requirements | eNB requirements | NR UE requirements |
|---|---|---|---|---|
| Without MBSFN subframe and DRS availability | Any LTE eNB | Any LTE UE | 30kHz SS block SCS; SS block on symbols 3-4; 10 MHz system bandwidth | 30kHz SS block SCS; SS block on symbols 3-4; 10 MHz system bandwidth |
| | | | 15 kHz SS block SCS; 5 MHz system bandwidth | 15 kHz SS block SCS; 5 MHz system bandwidth |
| With MBSFN subframe but without DRS availability | Any LTE eNB that implements Rel. 8 MBSFN subframes | Any LTE UE that implements Rel. 8 MBSFN subframes | *SS block in MBSFN subframes* | *SS block in MBSFN subframes* |
| | Any LTE eNB that implements Rel. 12 small cell on/off | Any LTE UE that implements Rel. 12 small cell on/off | 30kHz SS block SCS; SS block on non CRS symbols; 10 MHz system bandwidth | 30kHz SS block SCS; SS block on non CRS symbols; 10 MHz system bandwidth |
| | | | 15 kHz SS block SCS; 5 MHz system bandwidth | 15 kHz SS block SCS; 5 MHz system bandwidth |
| With MBSFN subframe and DRS availability | Any LTE eNB that implements Rel. 8 MBSFN subframes and Rel. 12 small cell on/off | Any LTE UE that implements Rel. 8 MBSFN subframes and Rel. 12 small cell on/off | *SS block in MBSFN subframes* | *SS block in MBSFN subframes* |

FIG. 16

INITIAL ACCESS CONFIGURATION FOR COEXISTENCE OF MULTIPLE WIRELESS COMMUNICATION SYSTEMS

TECHNICAL FIELD

The subject disclosure relates generally to communications systems, and, for example, to systems, methods and/or machine-readable storage media for initial access configuration for coexistence of multiple wireless communication systems.

BACKGROUND

To meet the huge demand for data centric applications, Third Generation Partnership Project (3GPP) systems and systems that employ one or more aspects of the specifications of the Fourth Generation (4G) standard for wireless communications will be extended to a Fifth Generation (5G) standard for wireless communications. Unique challenges exist to provide levels of service associated with forthcoming 5G standards.

BRIEF DESCRIPTION OF THE DRAWINGS

FIGS. 2A, 2B and 2C are examples of allocations of spectrum that illustrate how partitioning of spectrum can be employed to provide for coexistence of 5G and LTE in accordance with one or more embodiments described herein.

FIG. 5 is an example, non-limiting embodiment of a SS burst set with 4 SS blocks such as those of FIG. 4 in accordance with one or more embodiments described herein.

FIG. 16 shows an example, non-limiting embodiment of a table identifying configurations that can be selected by the control device in accordance with one or more embodiments described herein.

DETAILED DESCRIPTION

Figure 1:
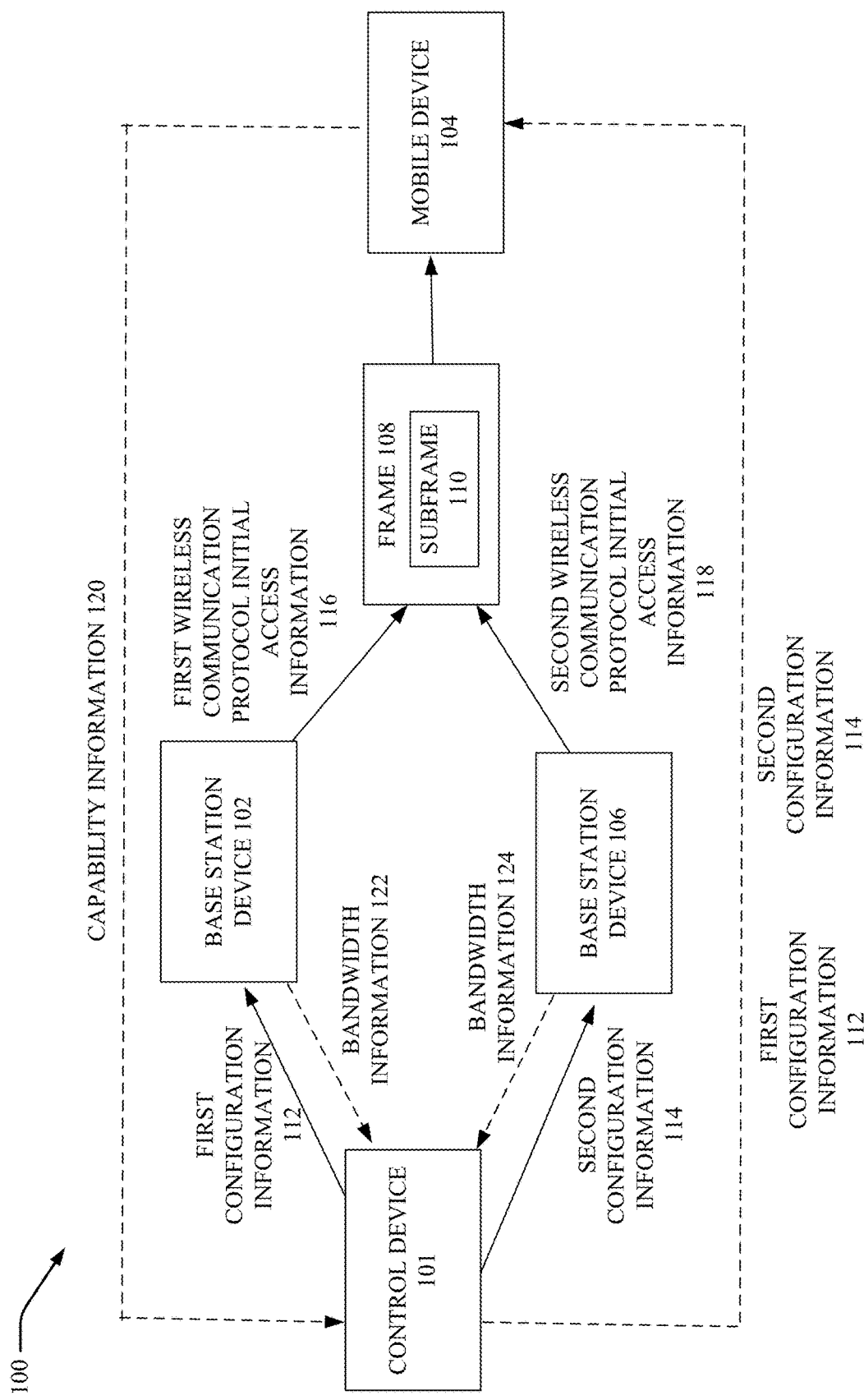
FIG. 1 illustrates an example, non-limiting block diagram of a system that facilitates initial access configuration for coexistence of multiple wireless communication systems in accordance with one or more embodiments described herein.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component.

One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "Node B (NB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.XX wireless technologies and/or legacy telecommunication technologies.

Legacy wireless systems such as LTE, Long-Term Evolution Advanced (LTE-A), High Speed Packet Access (HSPA) etc. can have downlink control channels that carry information about the scheduling grants. Typically this includes a number of multiple input multiple output (MIMO) layers scheduled, transport block sizes, modulation for each codeword, parameters related to hybrid automatic repeat request (HARQ), subband locations and also precoding matrix index corresponding to the sub bands. Typically, the following information can be transmitted based on the downlink control information (DCI) format: Localized/Distributed virtual resource block (VRB) assignment flag, resource block assignment, modulation and coding scheme, HARQ process number, new data indicator, redundancy version, transmit power control (TPC) command for uplink control channel, downlink assignment index, precoding matrix index and/or number of layers.

As used herein, "5G" can also be referred to as New Radio (5G) access. Accordingly, systems, methods and/or machine-readable storage media for facilitating initial access configuration for coexistence of multiple wireless communication systems in accordance with one or more embodiments are desired. As used herein, one or more aspects of a 5G network can comprise, but is not limited to, data rates of several tens of megabits per second (Mbps) supported for tens of thousands of users; at least one gigabit per second (Gbps) to be offered simultaneously to tens of users (e.g., tens of workers on the same office floor); several hundreds of thousands of simultaneous connections supported for massive sensor deployments; spectral efficiency significantly enhanced compared to 4G; improvement in coverage relative to 4G; signaling efficiency enhanced compared to 4G; and/or latency significantly reduced compared to LTE.

Access technology is being developed by 3GPP to enable future cellular network deployment scenarios and applications. It is expected that deployment of 5G will cover a wide array of spectrums from low frequency bands where current mobile networks operate (below 6 Gigahertz (GHz)) to new millimeter (mm) wave (mmW) spectrum (above 6 GHz). It is very likely that for early sub 6 GHz 5G deployments, both 5G and LTE will need to be deployed in the same or overlapping spectrum. Accordingly, one or more embodiments described herein provides technical solutions relating to the configuration of 5G initial access signals and channels to support semi-static and dynamic time-domain multiplexing (TDM) and frequency domain multiplexing (FDM) spectrum sharing mechanisms between LTE and 5G.

Systems, methods and/or machine-readable storage media facilitating initial access configuration for coexistence of multiple wireless communication systems in accordance with one or more embodiments are provided herein. One or more embodiments descried herein can provide systems, methods and/or machine-readable storage medium facilitating mapping 5G synchronization signal (SS) block transmissions within LTE regular downlink (DL) of multicast-broadcast single-frequency network (MBSFN) subframes to enable coexistence of 5G and LTE on overlapping spectrum; selecting a 5G SS block mapping configuration based on multiple factors including supported LTE and 5G device and network capabilities and traffic dynamics; and/or coordination and signaling of 5G SS block configurations between LTE and 5G.

A method, comprising: determining, by a control device comprising a processor, a capability of a mobile device configured to operate according to a first communication protocol; and selecting, by the control device, a numerology of numerologies for transmission of information from a base station device in a subframe of a frame, wherein the frame is associated with communications in accordance with the first communication protocol, wherein the selecting is based on the capability, wherein the numerologies are distinct combinations of frequency subcarrier spacing for synchronization signal blocks and placement locations of the synchronization signal blocks, and wherein the synchronization signal blocks are provided for initial access to a second communication protocol.

In another embodiment, a system is provided. The system can comprise: a processor; and a memory that stores executable instructions that, when executed by the processor, facilitate performance of operations. The operations can comprise: determining a capability of a mobile device configured to operate according to a first communication protocol; and selecting a numerology of numerologies for transmission of information from the apparatus in a subframe of a frame, wherein the selecting is based on the capability, and wherein the numerologies are distinct combinations of frequency subcarrier spacing for synchronization signal blocks for a second communication protocol.

In some embodiments, a machine-readable storage medium, comprising executable instructions that, when executed by a processor, facilitate performance of operations, comprising: transmitting, by a mobile device, to a control device, capability information, wherein the capability information comprises first information regarding whether the mobile device has multicast-broadcast single-frequency network subframe capability and discovery signal measurement capability; and receiving, by the mobile device, assignment information determined based on the capability information and comprising locations within a single subframe for transmission by the base station device of second information associated with a first communication protocol and third information associated with a second communication protocol, wherein the first communication protocol and the second communication protocol are distinct communication protocols.

One or more embodiments can: enable 5G initial access on 5G carriers with spectrum overlapping with LTE carriers with no (or, in some embodiments, limited) impact on 5G or LTE mobile device performance; enable operation of efficient and traffic aware time division multiplexing (TDM) and frequency division multiplexing (FDM) LTE and 5G coexistence techniques depending on whether LTE utilizes the regular DL of MBSFN subframes; and/or enable network flexibility in selection of appropriate 5G synchronization signal (SS) block configurations based deployment scenario and supported LTE and 5G coexistence techniques.

One or more embodiments can enable a given solution the different LTE and 5G device capabilities should be exchanged between LTE base station (BS) devices and 5G BS devices using either a standard (e.g., enhanced X2) interface or a proprietary interface and/or can provided by an Operations, Administration and Maintenance (OAM) configuration. In addition, in the case of non-standalone (NSA) operation of 5G, the 5G synchronization signal (SS) block configuration including the numerology and time pattern may be indicated to a UE by higher layer signaling via LTE (e.g., measurement object in a radio resource control (RRC) message).

FIG. 1 illustrates an example, non-limiting block diagram of a system that facilitates initial access configuration for coexistence of multiple wireless communication systems in accordance with one or more embodiments described herein. System 100 can enable current and/or future cellular network deployment scenarios and/or applications. In some embodiments, system 100 can facilitate multiple wireless communication protocols (e.g., LTE and 5G wireless communication protocols) in the same or overlapping spectrum. System 100 can select from two or more different configurations for 5G initial access signals and channels to support semi-static and dynamic time-domain multiplexing (TDM) and frequency domain multiplexing (FDM) spectrum sharing mechanisms between LTE and 5G.

As shown, system 100 can comprise a control device 101, two or more BS devices 102, 106 that operate according to different wireless communication protocols (e.g., BS device 102 can operate according to the LTE wireless communication protocol and BS device 106 can operate according to the 5G wireless communication protocol), and a mobile device 104. In some embodiments, the control device 101, BS devices 102, 106 and/or mobile device 104 can be electrically and/or communicatively coupled to perform one or more functions of system 100. While FIG. 1 shows the control device 101 remote from the BS devices 102, 106, in some embodiments, the control device 101 can be co-located with one or more of the BS devices 102, 106.

As shown in FIG. 1, in some embodiments, the BS devices 102, 106 can output information (e.g., initial access information) to a frame 108 that includes at least one subframe 110. In some embodiments, BS device 102 can output first wireless communication protocol initial access information 116 and BS device 106 can output second wireless communication protocol initial access information 118. The first wireless communication protocol initial access information 116 can be information for initial access to an LTE network by the mobile device 104 while the second wireless communication protocol initial access information 118 can be information for initial access to a 5G network by the mobile device 104.

In some embodiments, the subframe 110 can be a subframe employed by the BS device 102 for LTE initial access. However, system 100 can facilitate 5G initial access by enabling the BS device 102 to transmit in various portions of the subframe 110 information for 5G initial access.

The portions in which the BS devices 102, 106 will each transmit within can be determined by the control device 101 selection of one or more configurations that are described in greater detail herein and shown as Table 2. The configurations can include the first configuration information 112, which can be configuration information transmitted to the BS device 102 to inform the BS device 102 the locations in the subframe 110 at which to transmit the LTE initial access information. The configurations can also include the second configuration information 114, which can be configuration information transmitted to the BS device 106 to inform the BS device 106 the locations in the subframe 110 at which to transmit the 5G initial access information. In some embodiments, the control device 101 need not transmit the first configuration information 112 as the BS device 102 can be configured to continue to transmit LTE initial access information as the BS device 102 in the locations and manner of the subframe 110 that the BS device 102 has always transmitted the LTE initial access information (e.g., the frame 108 can be an LTE frame) and the control device 101 transmits only the second configuration information 104. In some embodiments, the control device 101 can transmit the first configuration information 112 and/or the second configuration information 114 (or other information indicating the contents of the first configuration information 112 and/or the second configuration information) to the mobile device 104 so that the mobile device 104 will know the location within the subframe 110 at which to location information for LTE initial access or for 5G initial access.

The control device 101 can also perform selection of the configuration based on evaluation of criteria related to the capability of the mobile device 104 and/or related to the bandwidth (BW) offered by the BS device 106, which is providing the 5G network. As shown in FIG. 1, the capability 120 of the mobile device 104 can be transmitted to the control device 101 (or, in some embodiments, the capability 120 need not be transmitted to the control device 101 and can be otherwise known or accessed by the control device 101 from the mobile device 104 or other device coupled to a network (not shown) to which the control device 101 is electrically and/or communicatively coupled. As also shown, the BW information 122, 124 of the respective BS devices 102, 106 can be transmitted to the control device 101 (or, in some embodiments, the BW information 122 and/or the BW information 124 need not be transmitted to the control device 101 and can be otherwise known or accessed by the control device 101 from the BS devices 102 and/or BS device 106 104 or other device coupled to a network (not shown) to which the control device 101 is electrically and/or communicatively coupled.

In subframe 110, the mobile device 104 can receive configuration information (e.g., as shown in Table 2 and FIG. 16) that would allow the mobile device 104 to have initial access to an LTE system and/or to a 5G system. For example, in some embodiments the information for initial access can be as shown and discussed herein.

Accordingly, system 100 facilitates transition from LTE to 5G in a seamless manner. In some embodiments, the mobile device 104 can be configured to operate according to the LTE wireless communication protocol while, in some embodiments, the mobile device 104 can be configured to operate according to the 5G wireless communication protocol. As used herein, the term "BS device" can be interchangeable with (or include) a network, a network controller or any number of other network components. While the embodiment shown indicates LTE and 5G wireless communication protocol, any number of wireless communication protocols can coexistence employing one or more of the structures described herein.

Figures 3A, 3B:
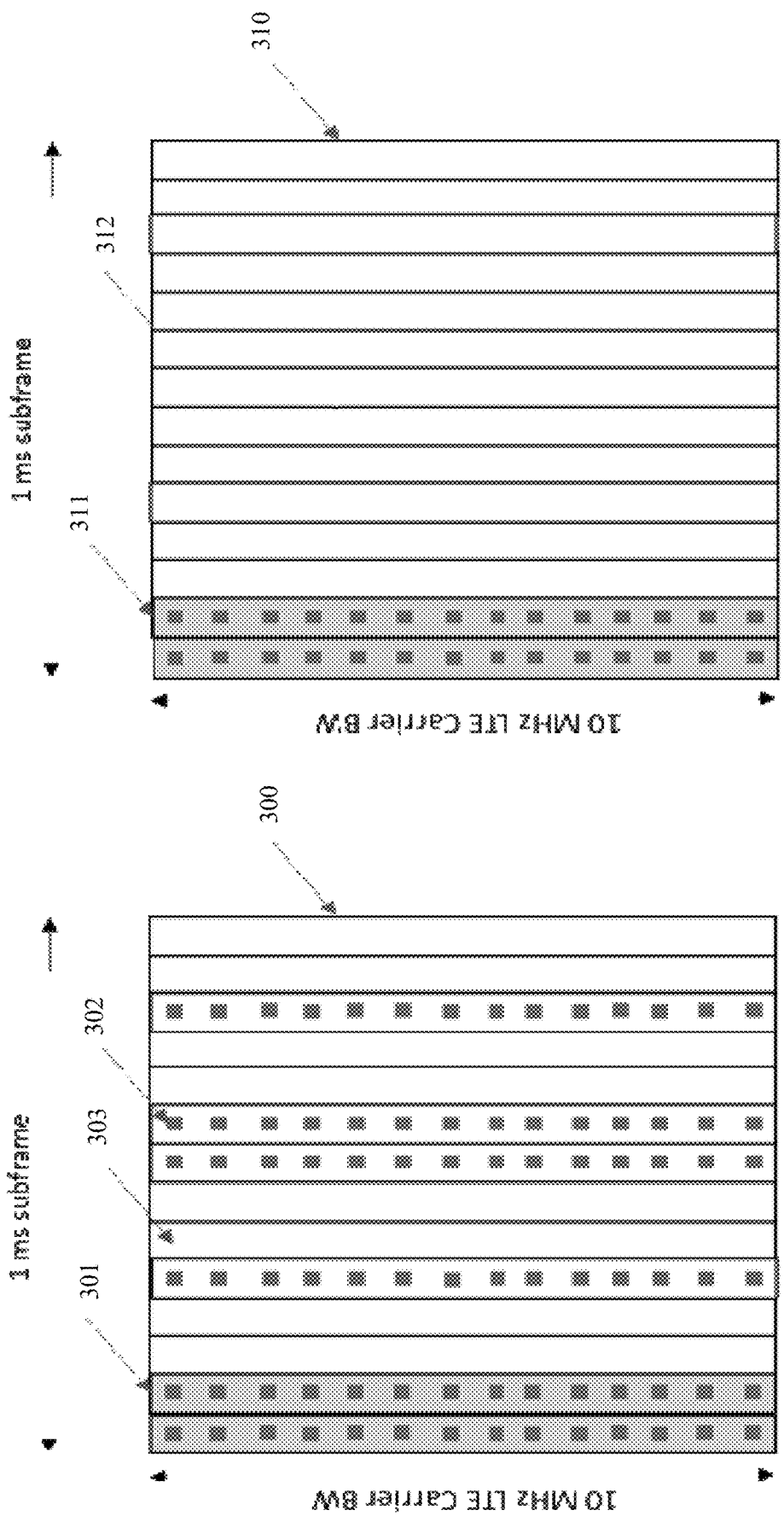
FIGS. 3A and 3B are examples, non-limiting LTE downlink (DL) and MBSFN subframes in accordance with one or more embodiments described herein.

FIGS. 2A, 2B and 2C are examples of allocations of spectrum that illustrate how partitioning of spectrum can be employed to provide for coexistence of 5G and LTE in some embodiments. FIGS. 3A and 3B are examples, non-limiting LTE downlink (DL) and MBSFN subframes in accordance with one or more embodiments described herein. Repetitive description of like elements employed in other embodiments described herein is omitted for sake of brevity. While the embodiments shown indicates LTE and 5G wireless communication protocol, any number of wireless communication protocols can coexistence employing one or more of the structures described herein.

FIG. 2A shows an embodiment prior to coexistence and employing LTE only, FIG. 2B shows coexistence and employing LTE and shows an embodiment that can be accommodated by the system 100 to provide for coexistence of 5G and LTE and FIG. 2C shows an embodiment after the network has fully migrated to 5G. For example, as shown in FIG. 2B, 5G and LTE can be provided in the same spectrum and there can be partitioning between 5G and LTE technologies. Over time, as shown in FIG. 2C, with growth of 5G, the partition may be updated (e.g., as more 5G-capable mobile devices (e.g., mobile device 104) enter the network or depending on the level of LTE traffic active on the carrier shown in FIGS. 2A, 2B and 2C at a given time). Utilizing SCell activation and deactivation of LTE is one backwards compatible method for achieving this sharing. FIGS. 2A, 2B and 2C illustrate semi-static sharing and dynamic sharing. Dynamic sharing can employ frequency partitioning as shown in FIG. 2B while semi-static sharing can employ time-based sharing.

FIGS. 3A and 3B are examples of allocations within DL and MBSFN subframes that illustrate use of the subframe for LTE systems prior to coexistence designs to include 5G and LTE in some embodiments. The DL subframe can have 14 symbols and if none of the symbols are translated for any DL data, there will remain CRS symbols 301. Symbols 303, 312 can be syndicated symbols that are empty (do not contain control information or CRS symbols) while 302 and 311 can be control subframes.

FIGS. 3A and 3B show more of the dynamic time partitioning, which, like the frequency partitioning shown in FIG. 2B, can be used in a semi-static or dynamic fashion. If a system employs an SCell activation and deactivation, this can be considered semi-static while if the system employs coordination techniques such as those described with reference to FIGS. 1 and 4-19, these can be considered a dynamic approach. In some embodiments, if signaling is performed on a radio resource control (RRC) level or higher, the approach can be considered semi-static. If the signaling is performed on the physical layer, the approach can be considered dynamic.

Although not shown, other even more dynamic mechanisms can also be supported for 5G to utilize resources not occupied by LTE transmissions on the same carrier. For example, a 5G base station device (e.g., BS device 106 of FIG. 1) can utilize regions of the LTE frame structure (e.g., frame 108 of FIG. 1) which do not contain transmissions of any always on physical signals and channels. These regions can be employed by the 5G BS device (e.g., BS device 106)

of FIG. 1 to transmit to the mobile device (e.g., mobile device 104 of FIG. 1) control information and data transmissions instead. Examples of such configurations of the frame 108 that include available regions that can be transmitted within by the 5G BS device (e.g., BS device 106 of FIG. 1) thereby providing downlink (DL) transmissions can include symbols 303 and 312 of FIGS. 3A and 3B, respectively. Other regions include one or more LTE DL subframes such as LTE DL subframe 300 of FIG. 3A (which can be subframe 110 of FIG. 1 in some embodiments) and/or one or more LTE MBSFN subframes such as LTE MBSFN subframe 310 (which can be subframe 110 of FIG. 1 in some embodiments). Other regions that can be employed by the 5G BS device can be any regions not containing common control channels (e.g., such as 301, 311) and not containing CRS (e.g., such as 302). This LTE/5G multiplexing can be more dynamic than SCell activation/deactivation depending on the level of interworking between the LTE BS device (e.g., BS device 102 of FIG. 1) and the 5G BS device (e.g., BS device 106 of FIG. 1) resource allocation configurations. In the example subframes shown in FIG. 3A, the slots are 0.5 millisecond (ms), the subframe is 1 ms and presented is 10 Megahertz (MHz) LTE carrier BW. However, in other embodiments, the slot time, subframe time and/or the BW can vary or differ from that shown in FIGS. 3A and 3B.

In order to support 5G operation under such semi-static and dynamic sharing scenarios, the signals and channels required for initial access and radio resource monitoring (RRM) by 5G UEs should be transmitted on the 5G carrier. However unlike the control and data channels/signals which are primarily mobile device-specifically configured and can be turned off when no 5G user traffic is present in the cell, the initial access signals including the 5G primary and secondary synchronization signal (5G PSS/5G SSS), and 5G physical broadcast channel (5G PBCH) are cell specific and periodically transmitted signals that are always on.

Figure 4:
FIG. 4 is an example, non-limiting embodiment of a synchronization signal (SS) block in accordance with one or more embodiments described herein.

FIG. 4 is an example, non-limiting embodiment of a synchronization signal (SS) block in accordance with one or more embodiments described herein. The 5G initial access signals in the DL can form a synchronization signal (SS) block (e.g., 1 primary synchronization (PSS) symbol, 1 secondary synchronization (SSS) symbol and 2 physical broadcast channel (PBCH) symbols) as shown in FIG. 4. In an example scenario, the PSS occupies 127 subcarriers while the PBCH occupies 288 subcarriers.

The time duration and frequency BW of the signals in SS block 400 can be fixed in the specification as a function of the chosen subcarrier spacing (SCS) for the SS block 400. 5G can support multiple SCS values for the SS block 400 to cover a diverse range of coverage and mobility scenarios across a range of frequency spectrum. Example values of the SS block 400 numerology are shown in Table 1. As shown, numerology can mean a combination of time and frequency resources occupied. These numerology can be selected based on subcarrier spacing in some embodiments. There are four numerologies shown in Table 1 from which to select.

TABLE 1

| SS Block SCS | SS Block BW | SS Block Time Duration |
| --- | --- | --- |
| 15 Kilohertz (kHz) | 4.32 MHz | .285 ms |
| 30 kHz | 8.64 MHz | .143 ms |
| 120 kHz | 34.56 MHz | .035 ms |
| 240 kHz | 69.12 MHz | .017 ms |

Shown in Table 1 are four different configurations of SS block SCS, SS block BW and SS block time duration. In some embodiments, each (or, one or more) SS blocks (e.g., SS block 400) can be transmitted periodically (e.g., every 20 ms) on given time and frequency combination.

FIG. 5 is an example, non-limiting embodiment of a SS burst set with 4 SS blocks. Repetitive description of like elements employed in other embodiments described herein is omitted for sake of brevity. As shown in FIG. 5, multiple SS blocks can be transmitted on a carrier to support beam-sweeping based on analog beamforming, where each SS block can correspond to a different analog beam. A SS block ID (or time index) can be provided by the SS block signals, and such can allow a mobile device (e.g., mobile device 104 of FIG. 1) to identify the different SS block transmissions, which can be important for mobility measurement reports and cell selection. One or more SS blocks can be transmitted in a short time interval making up a SS burst (e.g. 1 or 2 5G slots of 7 or 14 symbols), while all of the SS bursts comprise a SS burst set with a composition of time domain locations for the individual SS blocks which repeats with the same SS burst Set periodicity with L=4 SS blocks as shown in FIG. 5. The locations of the SS blocks within a burst can be determined according to a 5G SS block time pattern configuration and repeated for all bursts within a burst set. The 5G SS block time pattern configuration can be fixed in the specification per band or can be indicated to the mobile device (e.g., mobile device 104 of FIG. 1) by higher layer signaling (e.g., system information or RRC). In some embodiments, the burst set can be interleaved into the LTE frame structure (e.g., frame 108 with subframe 110) to provide for coexistence of 5G initial access with LTE initial access.

With reference to FIGS. 1, 3A and 3B, depending on whether the subframe is the DL subframe of FIG. 3A or the MBFSN subframe of FIG. 3B, the control device 101 can select a suitable numerology of possible numerologies for the SS block.

One or more embodiments provided herein facilitate 5G initial access configuration and enable multiplexing the 5G SS blocks of a 5G SS burst set in a FDM or TDM manner with LTE signals and channels for the purpose of LTE-5G coexistence. One or more embodiments described herein do so. In one or more embodiments, SS blocks are not transmitted in any symbols of a slot or subframe containing common control or cell-specific reference signals (CRS) as this could cause significant interference for both LTE and 5G mobile devices. For example in FIG. 3A above, in one or more embodiments, symbols {0, 1, 4, 7, 8, 11} can be avoided in LTE normal DL subframes, while for FIG. 3B, symbols {0, 1} can be avoided when 5G and LTE transmissions are multiplexed within LTE MBSFN subframes. In addition the 5G SS block time pattern configuration can enable efficient 5G operation as well, such that 1 or 2 symbols at the beginning of the (7 or 14 symbol) slot are not utilized for SS blocks and can be reserved for 5G downlink control channel transmissions. Similarly, 1 or 2 symbols at the end of the (7 or 14 symbol) slot are not utilized for SS blocks and can be reserved for 5G uplink control channel transmissions.

Additionally, one or more embodiments can coordinate the LTE subframe pattern (e.g., ratio of regular and MBSFN subframes and time domain mapping pattern) and the 5G SS burst set configuration (e.g., numerology, number of transmitted SS blocks, and time domain pattern) can employ signaling mechanisms between LTE BS devices (e.g., BS device 102 of FIG. 1) and 5G BS devices (e.g., BS device 106 of FIG. 1) that are not currently supported.

Figure 6:
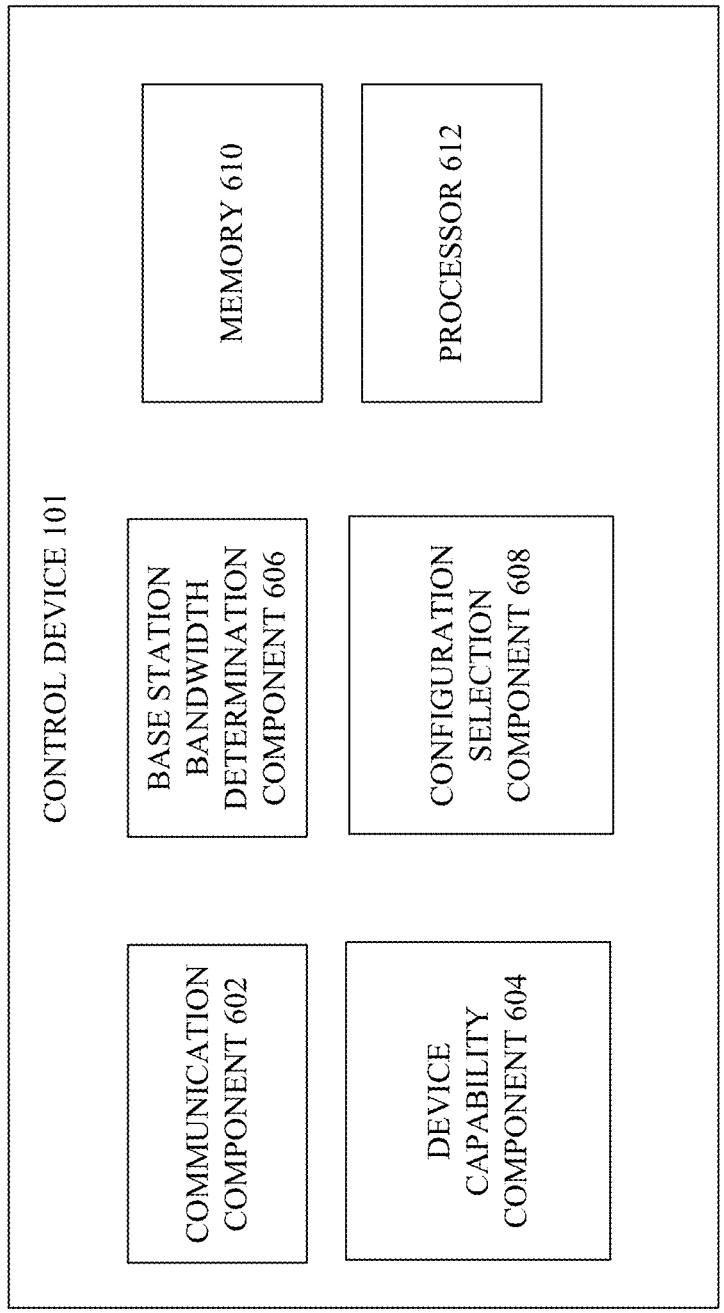
FIG. 6 illustrates an example, non-limiting block diagram of a control device that facilitates initial access configuration for coexistence of multiple wireless communication systems in accordance with one or more embodiments described herein.
Figure 7:
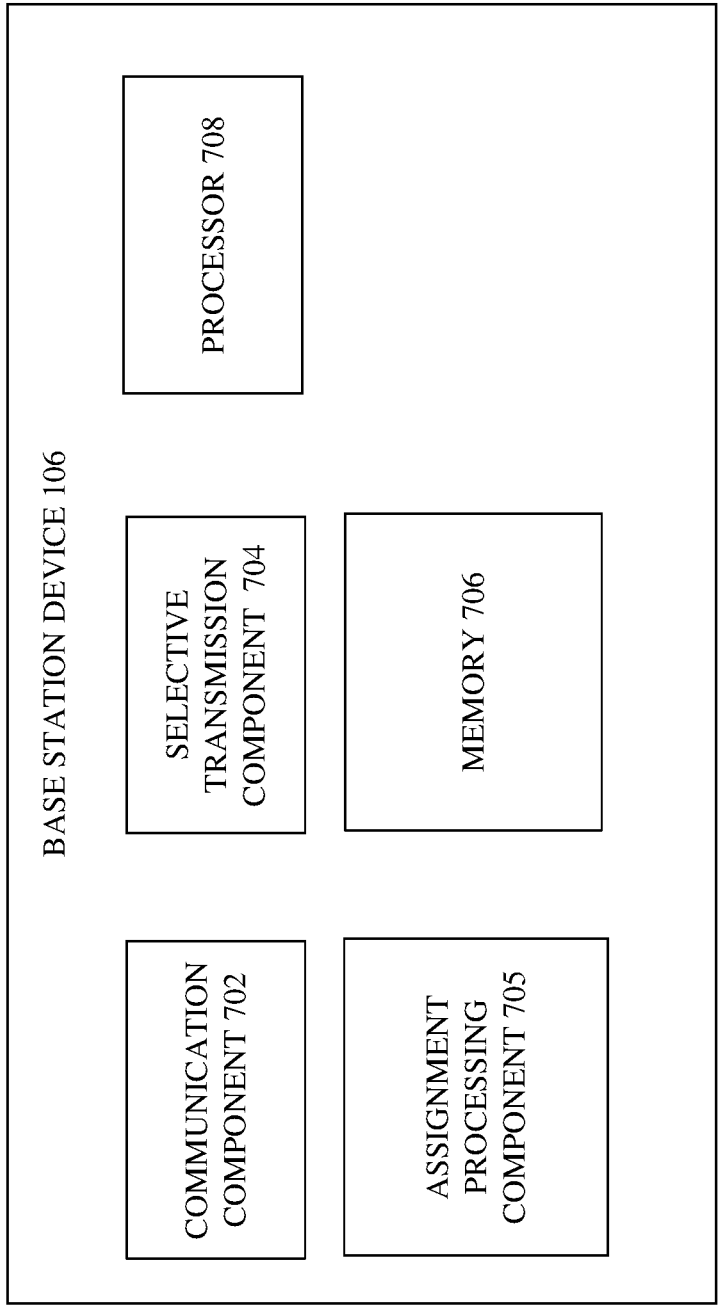
FIG. 7 illustrates an example, non-limiting block diagram of a base station device for which the control device of FIG. 6 can facilitate initial access configuration for coexistence of multiple wireless communication systems in accordance with one or more embodiments described herein.
Figure 8:
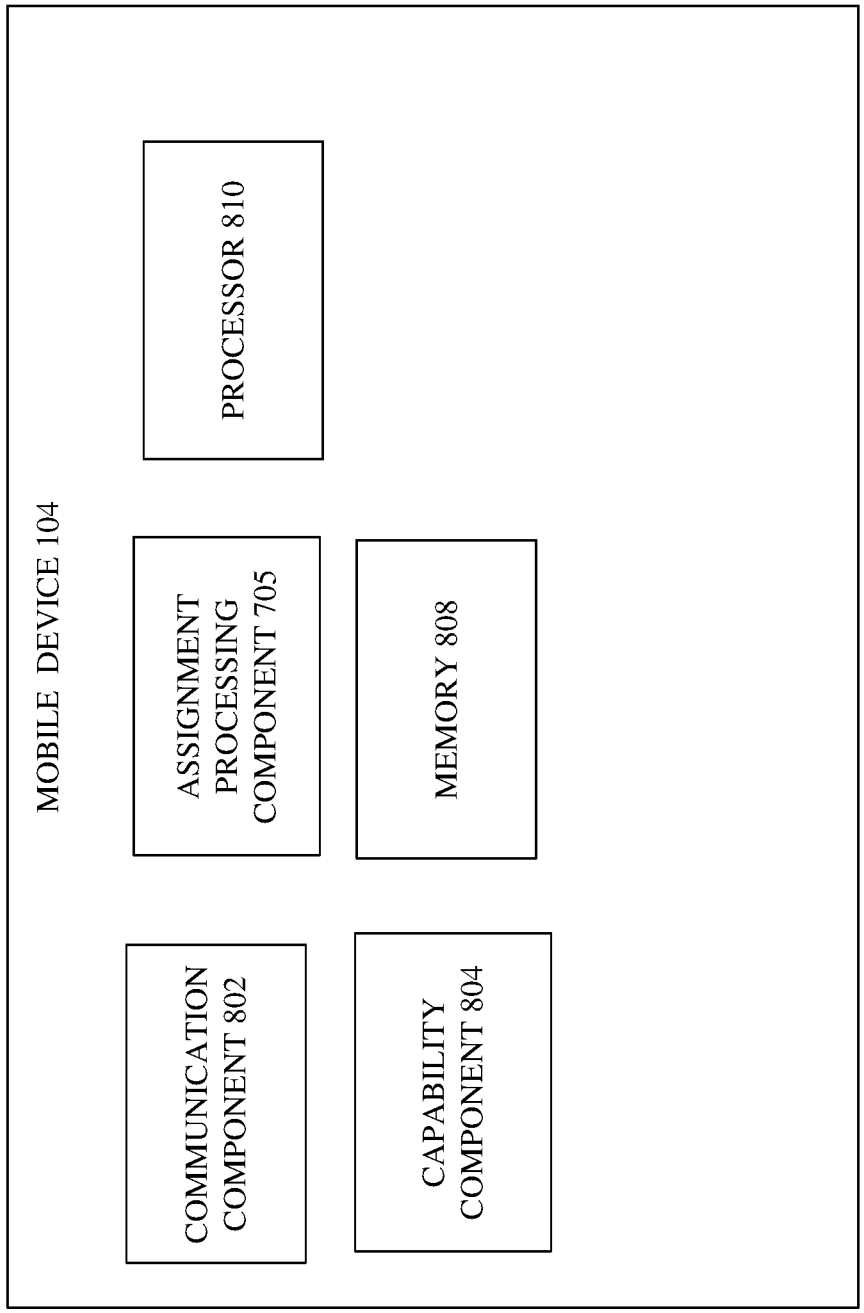
FIG. 8 illustrates an example, non-limiting block diagram of a mobile device for which the control device of FIG. 2 can facilitate initial access configuration for coexistence of multiple wireless communication systems in accordance with one or more embodiments described herein.

One or more functions and structure of different embodiments of system 100, control device 101, BS devices 102, 106, and/or mobile device 104 can be described with reference to FIGS. 6, 7 and 8. FIG. 6 illustrates an example, non-limiting block diagram of a control device that facilitates initial access configuration for coexistence of multiple wireless communication systems in accordance with one or more embodiments described herein. FIG. 7 illustrates an example, non-limiting block diagram of a base station device for which the control device of FIG. 6 can facilitate initial access configuration for coexistence of multiple wireless communication systems in accordance with one or more embodiments described herein. FIG. 8 illustrates an example, non-limiting block diagram of a mobile device for which the control device of FIG. 6 can facilitate initial access configuration for coexistence of multiple wireless communication systems in accordance with one or more embodiments described herein. Repetitive description of like elements employed in other embodiments described herein is omitted for sake of brevity.

As shown in FIG. 6, the control device 101 can be comprised in the BS device 102, 106 and/or any other network control device. The control device 101 can comprise communication component 602, device capability component 604 that can determine the mobile device 104 capability, BS BW determination component 606 that can determine the minimum BW (or a BW) of the 5G BS device (e.g., BS device 106), the configuration selection component 608 (which can select a configuration for transmission by the BS device 106, where the configuration options are as shown, for example, in FIG. 16 and discussed below) and the memory 610 (which can store computer readable or machine readable storage media that can be executed by the processor 612 to perform operations including, but not limited to, determining mobile device capability and/or selecting configuration). In various embodiments, one or more of communication component 602, device capability component 604, BS BW determination component 606, configuration selection component 608, memory 610 and/or processor 612 can be electrically and communicatively coupled to one another to perform one or more functions of control device 101.

The BS device 106 can comprise a communication component 702, assignment processing component 705 (which can receive and process an assigned configuration and transmit 5G initial access information according to the configuration assigned by the control device 101), a selective transmission component 704 (which can selectively transmit according to the parameters of the configuration, memory 706 and processor 708 (which can store computer readable or machine readable storage media that can be executed by the processor 706 to perform operations including, but not limited to, receiving configuration, processing configuration, transmitting access information for 5G within an LTE subframe). In various embodiments, one or more of communication component communication component 702, assignment processing component 705, selective transmission component 704, memory 706 and processor 708 can be electrically and/or communicatively coupled to one another to perform one or more functions of the BS device 106.

Mobile device 104 can comprise a communication component 802, capability component 804, assignment processing component 705 (which can receive configuration information assigned to know the location at which to process the subframe to receive either LTE initial access information or 5G initial access information) memory 808, processor 810.

In one or more embodiments, the control device 101 can map 5G SS block transmissions within LTE regular DL and MBSFN subframes to enable coexistence of 5G and LTE on overlapping spectrum. The control device 101 can employ criteria in order to determine the information for mapping. The control device 101 can select a 5G SS block mapping configuration based on multiple factors including supported LTE and 5G device and network capabilities and traffic dynamics. As such, the control device 101 can determine, for example, which configuration is appropriate given device type for the mobile device 104 and/or BW capability of the 5G BS device (e.g., BS device 106 of FIG. 1). In some embodiments, the control device 101 can provide coordination and/or signaling of 5G SS block configurations between LTE and 5G.

In some embodiments, various combinations of 5G SS block numerology and LTE and 5G frame structures from which control device 101 can select can be as shown envisioned and for convenience are identified by the following alternatives in Table 2 below. If certain combinations are not supported they are indicated as N/A in the table.

TABLE 2

5G SS block Time Pattern Configuration Alternatives

| LTE | | Alt. 1: no 5G data | | Alt. 2: 15 kHz 5G data, 14 symbol 5G slot | | Alt. 3: 30 kHz 5G data, 14 symbol 5G slot | Alt. 4: 15 kHz 5G data, 7 symbol 5G slot | Alt. 5: LTE DL, 30 kHz 5G data, 7 symbol 5G slot |
|---|---|---|---|---|---|---|---|---|
| subframe type | | DL | MBSFN | DL | MBSFN | MBSFN | MBSFN | MBSFN |
| 5G numerology | 15 kHz | N/A | Type 15A.2 | N/A | Type 15B.2 | Type 15C.2 | Type 15C.1 | N/A |
| | 30 kHz | Type 30A.2 | Type 30A.4 | Type 30.A1 | Type 30A.3 | Type 30B.3 | Type 30B.3 | Type 30C.3 |

The control device 101 can select among several different alternative shown in Table 2 above: alternatives 1, 2, 3, 4 or 5. Each different alternative can be a pattern. The control device 101 can evaluate the type of 5G BS device BW (whether the BS device has at least a minimum BW necessary), the type of the mobile device (e.g., mobile device 104) and what type of device is present and select an alternative. The mobile device 104 can also provide DL subframes or MBSFN subframes and that consideration can also go into whether the control device 101 selects alternative 1, 2, 3, 4 or 5.

Figure 9:
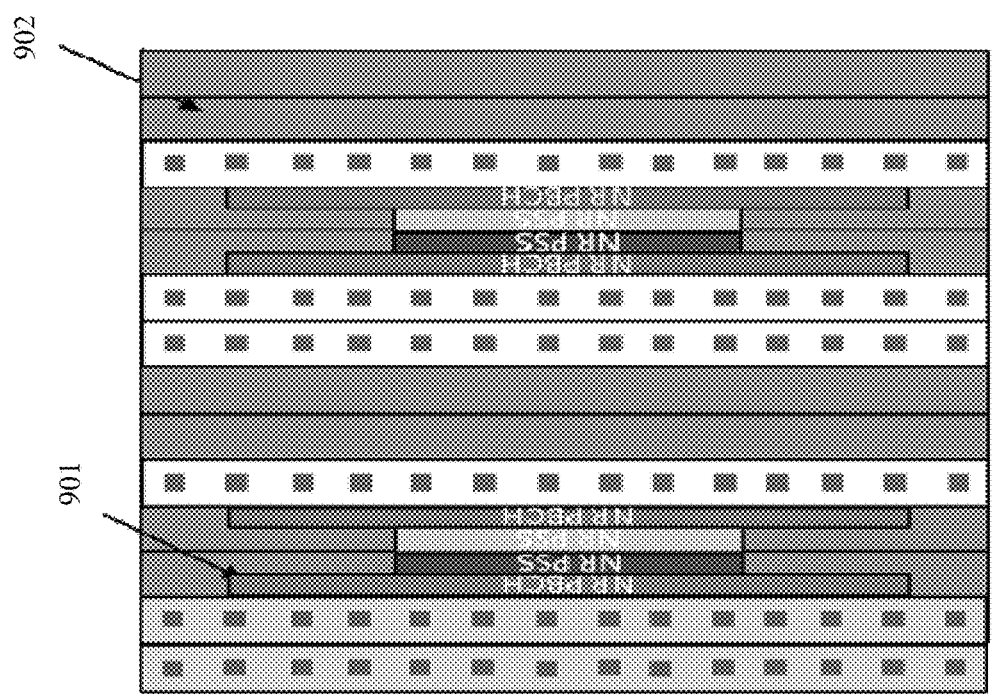
FIG. 9 illustrates an example, non-limiting block diagram of an SS block Time Pattern Configuration (Type 30A.2), which is alternative 1, for coexistence of multiple wireless communication systems in accordance with one or more embodiments described herein.

FIG. 9 illustrates an example, non-limiting block diagram of an SS block Time Pattern Configuration (Type 30A.2) for coexistence of multiple wireless communication systems in accordance with one or more embodiments described herein. Repetitive description of like elements employed in other embodiments described herein is omitted for sake of brevity.

In one embodiment of the invention (Alt. 1), the 5G SS block time pattern configuration is determined to enable multiplexing of 5G SS blocks within LTE regular DL and MBSFN subframes without consideration of additional multiplexing of 5G control or data transmissions. FIG. 9 shows the pattern for 30 kHz SS block SCS within a LTE regular DL subframe and is identified as Type 30A.2 since 2 SS blocks 901 are multiplexed within the SS burst (1 ms duration). The remaining symbols 902 can be utilized by 5G for data transmissions if cross-slot or cross-carrier scheduling is supported.

Figure 10:
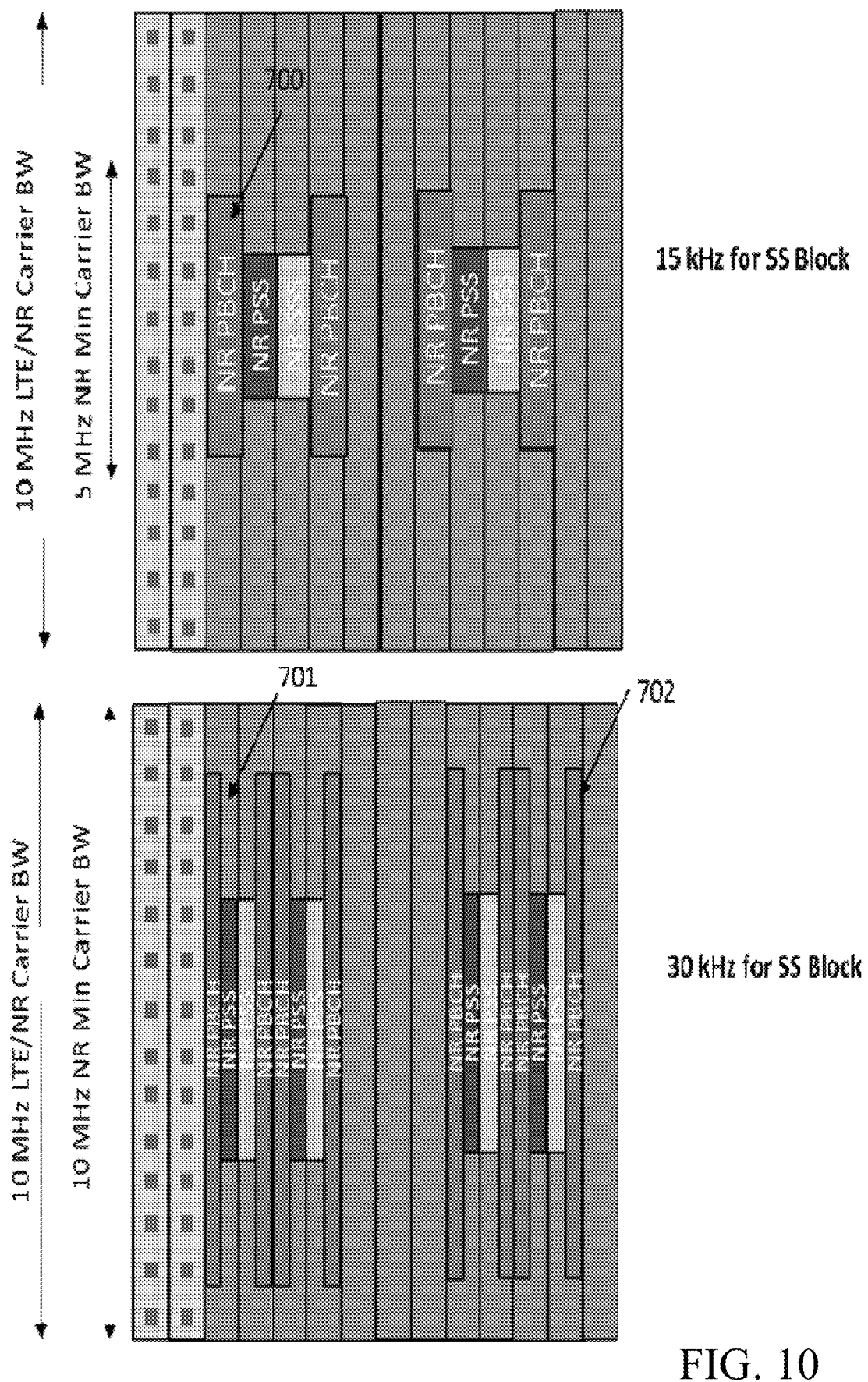
FIG. 10 illustrates an example, non-limiting block diagram of an SS block Time Pattern Configuration (Types 15A.2 and 30A.4), which is also alternative 1, for coexistence of multiple wireless communication systems in accordance with one or more embodiments described herein.

In FIGS. 9 and 10, the LTE signals (CRS and common control) and the configuration has the 5G SS blocks but there are no symbols reserved for 5G control. As such, in the embodiment of FIG. 9 (and the embodiment of FIG. 10 below also) it is not possible to schedule the 5G data in those blocks, that applies to FIG. 7 too, these are alt 1.

FIG. 10 shows the patterns for 15 kHz and 30 kHz SS block SCS within a LTE MBSFN subframe identified as Type 15A.2 and Type 30A.4 respectively. In case of Type 30A.4, the same placement of the SS blocks in Type 30A.2 is utilized, however since CRS symbols are not present after symbol 1, an additional 2 SS blocks 901 are multiplexed within the SS burst. It should be noted that one consideration in selection numerology for the SS blocks is the tradeoff between the time footprint of the 15 kHz SS block compared to the 30 kHz SS block, while the 30 kHz SS block has twice the required minimum carrier BW as the 15 kHz SS block. Depending on the spectrum availability, the network can select a given a SS block composition type.

Figure 11:
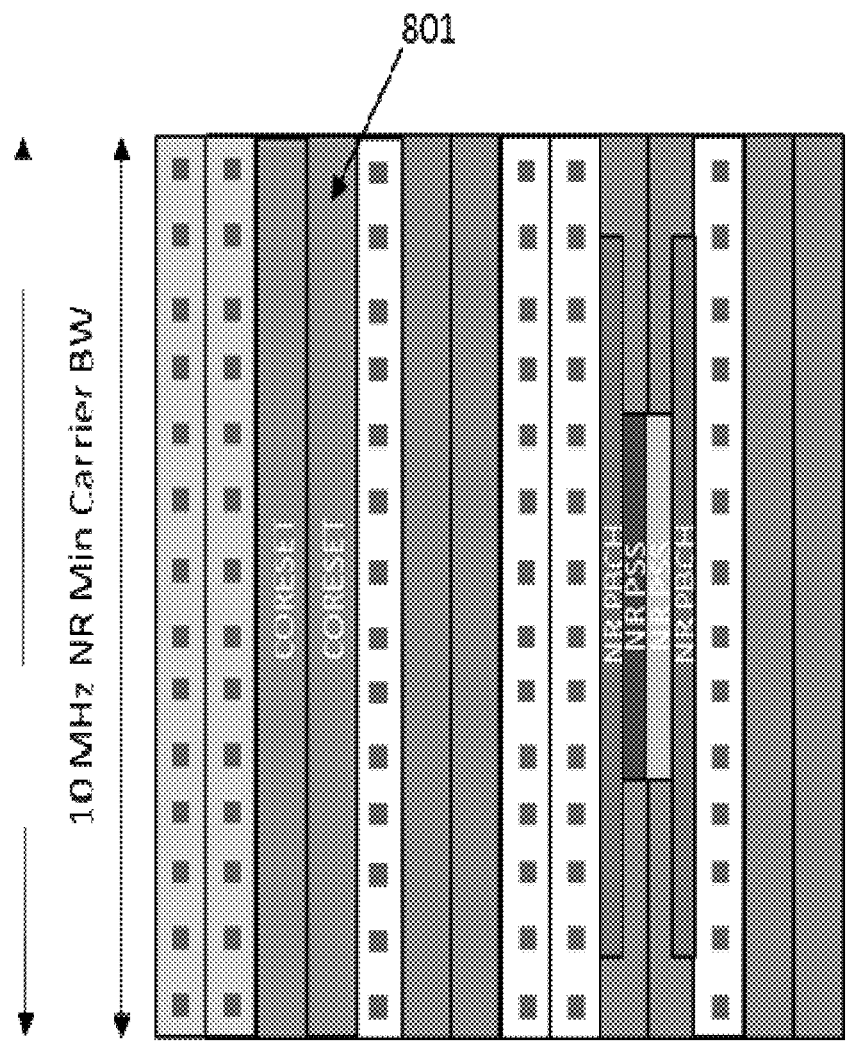
FIG. 11 illustrates an example, non-limiting block diagram of an SS block Time Pattern Configuration (Types 30A.1), which is alternative 2, for coexistence of multiple wireless communication systems in accordance with one or more embodiments described herein.

FIG. 11 illustrates an example, non-limiting block diagram of an SS block Time Pattern Configuration (Types 30A.1), which is alternative 2, for coexistence of multiple wireless communication systems in accordance with one or more embodiments described herein. Alternative 2 includes the CORESET information in the 5G data.

In this configuration, the 5G SS block time pattern configuration is determined to enable multiplexing of 5G SS blocks within LTE regular DL and MBSFN subframes while take into account additional multiplexing of 15 kHz-based 5G control and data transmissions to support allocation within a 14 symbol slot. FIG. 11 shows the pattern for 30 kHz SS block SCS within a LTE regular DL subframe and is identified as Type 30A.1, which is similar to Type 30A.2 except that the first SS block location is replaced by 5G control resource sets (CORESET).

Figure 12:
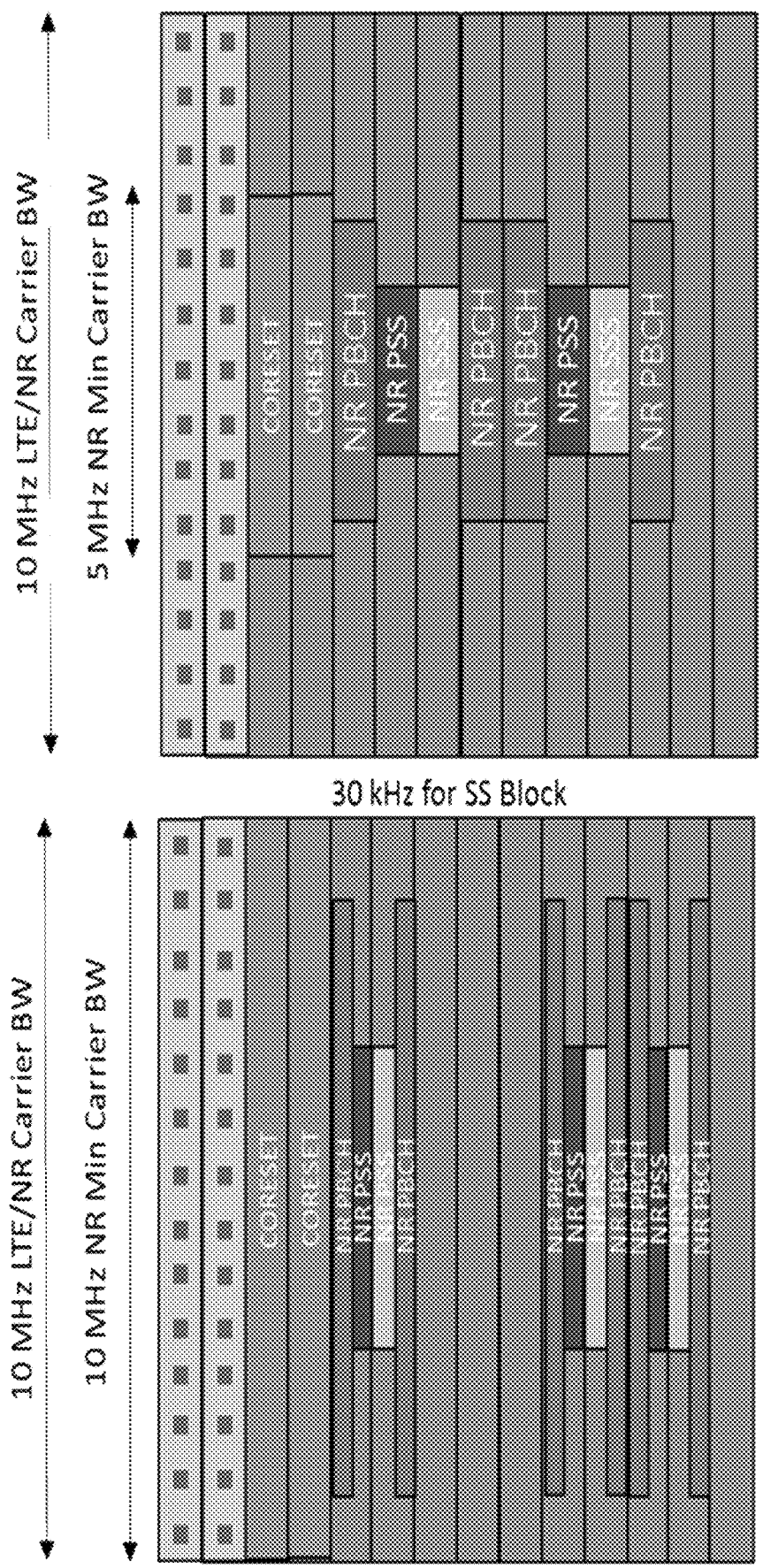
FIG. 12 illustrates an example, non-limiting block diagram of an SS block Time Pattern Configuration (Types 15B.2 and 30A.3), which is alternative 3, for coexistence of multiple wireless communication systems in accordance with one or more embodiments described herein.

FIG. 12 illustrates an example, non-limiting block diagram of an SS block Time Pattern Configuration (Types 15B.2 and 30A.3), which is alternative 3, for coexistence of multiple wireless communication systems in accordance with one or more embodiments described herein. FIG. 12 shows the patterns for 15 kHz and 30 kHz SS block SCS within a LTE MBSFN subframe identified as Type 15B.2 and Type 30A.3 respectively. In case of Type 30A.3, the same placement of the SS blocks in Type 30A.4 is utilized, however the first SS block location is replaced by 5G CORESETs. Also Type 15B.2 has the SS block locations shifted by 2 symbols compared to Type 15A.2 in order to accommodate 5G CORESETs.

In this configuration, the 5G SS block time pattern configuration is determined to enable multiplexing of 5G SS blocks within LTE regular DL and MBSFN subframes while taking into account additional multiplexing of 30 kHz-based 5G control and data transmissions to support allocation within a 14 symbol slot. The primary difference in this case from Alt. 2 is that 30 kHz-based control and data transmissions utilized symbols which have half the duration of 15 kHz symbols.

Figure 13:
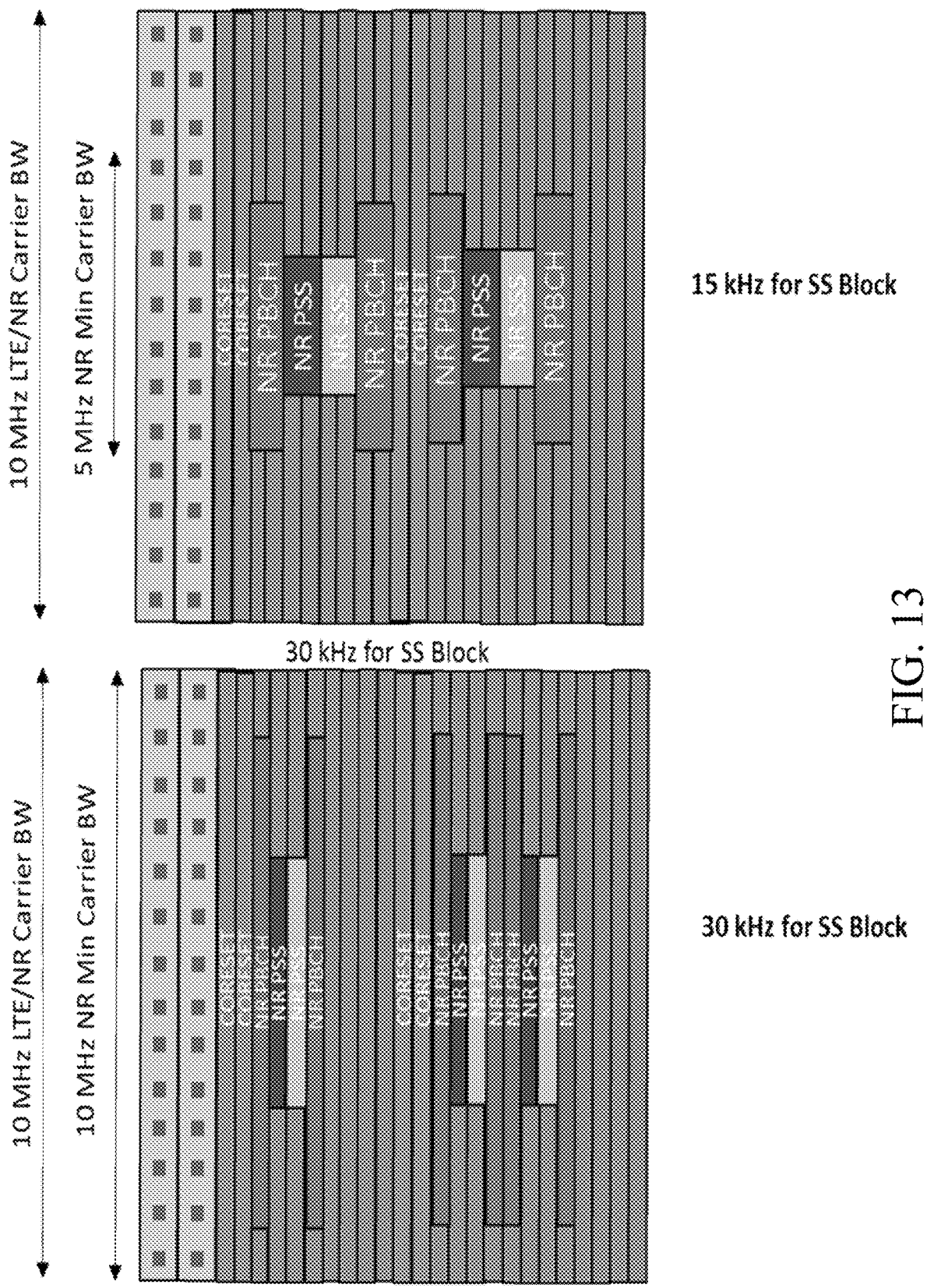
FIG. 13 illustrates an example, non-limiting block diagram of an SS block Time Pattern Configuration (Types 15C.2 and 30B.3), which is alternative 4, for coexistence of multiple wireless communication systems in accordance with one or more embodiments described herein.

FIG. 13 illustrates an example, non-limiting block diagram of an SS block Time Pattern Configuration (Types 15C.2 and 30B.3), which is alternative 4, for coexistence of multiple wireless communication systems in accordance with one or more embodiments described herein. FIG. 13 shows the patterns for 15 kHz and 30 kHz SS block SCS within a LTE MBSFN subframe identified as Type 15C.2 and Type 30B.3 respectively. In case of Types 15C.2 compared to Type 15B.2 the SS blocks locations are shifted by 2 symbols of 30 kHz instead of 2 symbols of 15 kHz which is equivalent to a shift of only 1 15 kHz symbol.

In this configuration, the 5G SS block time pattern configuration is determined to enable multiplexing of 5G SS blocks within LTE regular DL and MBSFN subframes while taking into account additional multiplexing of 15 kHz-based 5G control and data transmissions to support allocation within a 7 symbol slot. The primary difference in this case from Alt. 2 and Alt. 3 is that only a single 15 kHz control symbol is utilized at the beginning of the 7-symbol 5G slot and the last symbol of the 7 symbol slot is avoided by SS block transmissions.

Figure 14:
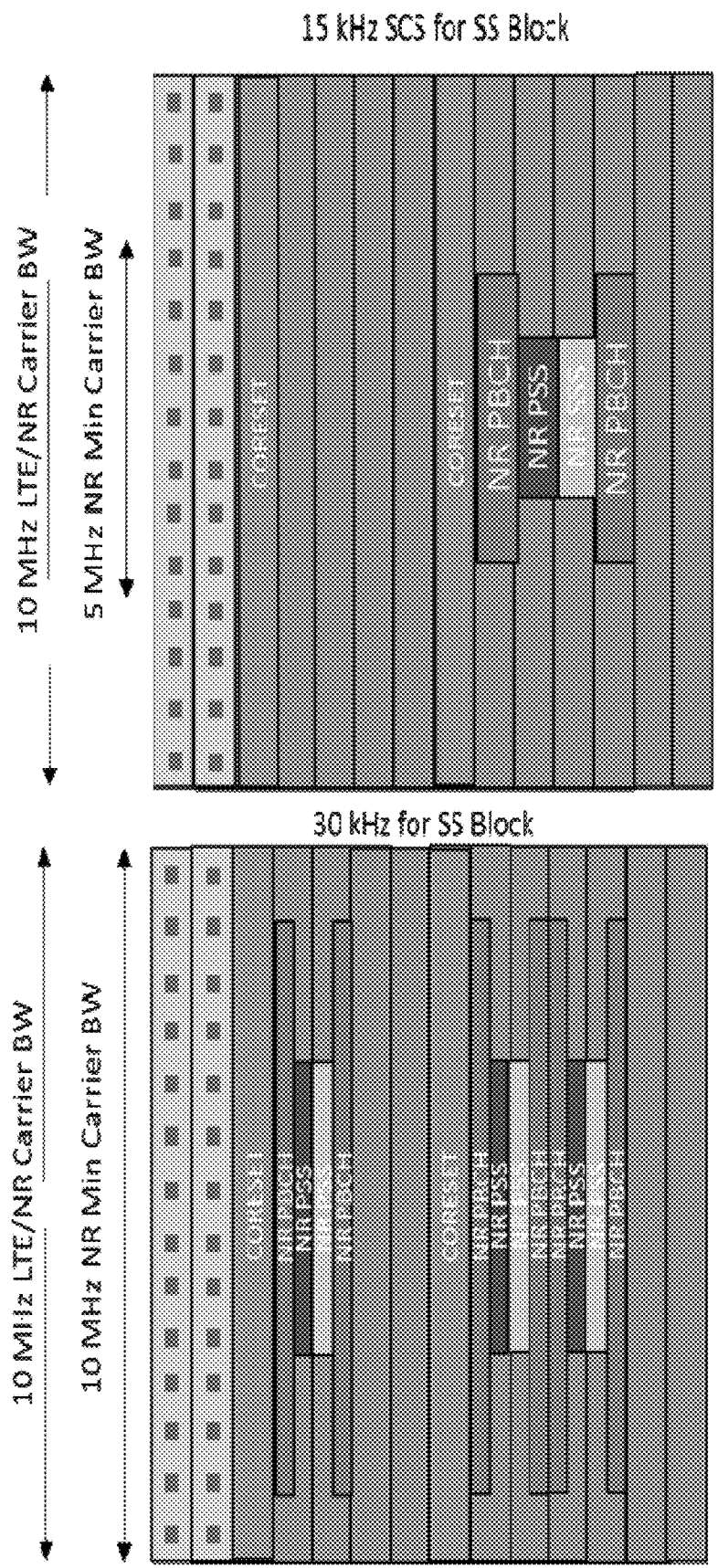
FIG. 14 illustrates an example, non-limiting block diagram of an SS block Time Pattern Configuration (Types 15C.1 and 30B.3), which is alternative 5, for coexistence of multiple wireless communication systems in accordance with one or more embodiments described herein.

FIG. 14 illustrates an example, non-limiting block diagram of an SS block Time Pattern Configuration (Types 15C.1 and 30B.3), which is alternative 5, for coexistence of multiple wireless communication systems in accordance with one or more embodiments described herein. FIG. 14 shows the patterns for 15 kHz and 30 kHz SS block SCS within a LTE MBSFN subframe identified as Type 15C.1 and Type 30B.3 respectively. It is noted that Type 30B.3 is utilized for both Alt. 3 and Alt. 4 since the 2 30 KHz CORESET symbols at the beginning of 30 kHz-based 5G slots are equivalent in time duration to 1 single 15 kHz CORESET symbol at the beginning of a 15 kHz-based 5G slot. In addition Type 15C.1 is the same pattern as Type 15C.2 with the first SS block location removed in order to enable the last symbol of the 15 kHz-based 5G slot to contain data or control transmissions.

In this configuration, the 5G SS block time pattern configuration is determined to enable multiplexing of 5G SS blocks within LTE regular DL and MBSFN subframes while taking into account additional multiplexing of 30 kHz-based 5G control and data transmissions to support allocation within a 7 symbol slot.

Figure 15:
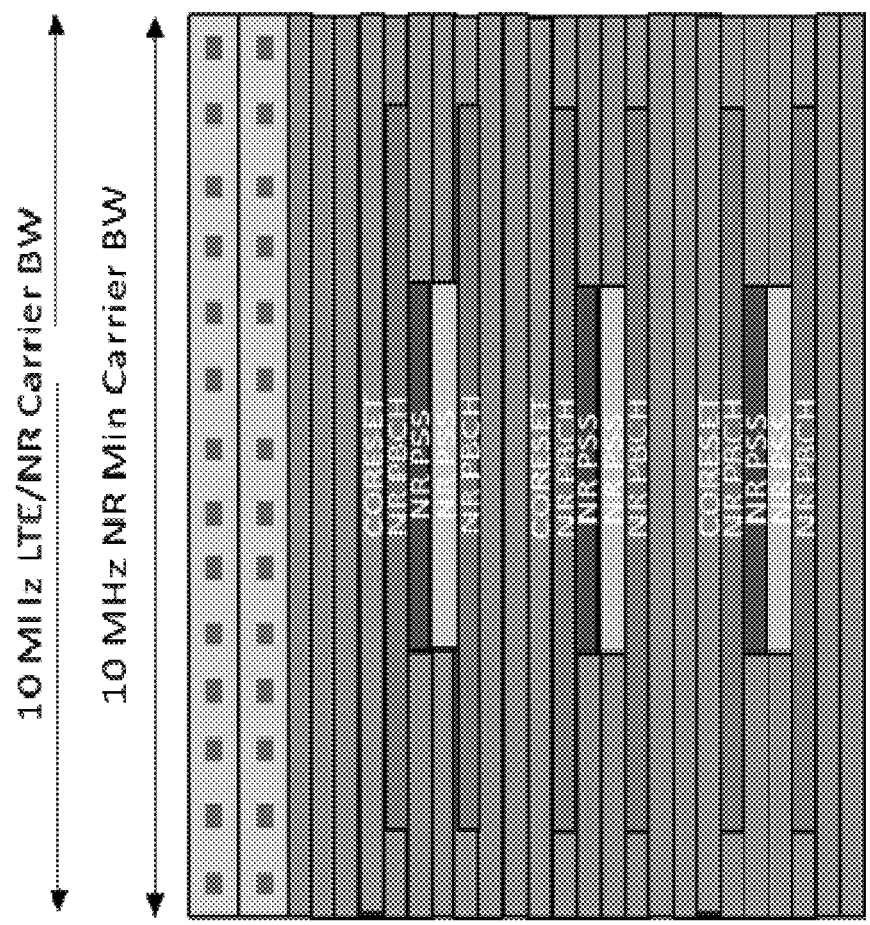
FIG. 15 shows the pattern for a 30 kHz SS block SCS within a LTE MBSFN subframe identified as Type 30C.3 in accordance with one or more embodiments described herein.

FIG. 15 shows the pattern for a 30 kHz SS block SCS within a LTE MBSFN subframe identified as Type 30C.3. In this embodiment, the 5G SS block time pattern configuration is selected by the network based on multiple factors including spectrum availability, LTE and 5G feature support capabilities by the network and end-user devices. For example LTE MBSFN subframes may not be supported by any or all devices on a given carrier or discovery signal (DRS) measurements required to enable fast LTE SCell activation/deactivation.

FIG. 16 shows an example, non-limiting embodiment of a table identifying configurations that can be selected by the control device 101. First the control device 101 selects the Solution (first column) based on the capability of the mobile device 104. Then the control device 101 assigns the SCS that corresponds (shown in the column titled "gNB requirements"). In some embodiments, the 5G BS device (e.g., BS device 106 of FIG. 1) must have at least the BW specified in the column titled "gNB requirements" that corresponds to the selected Solution of column 1.

For example, in some embodiments, if a mobile device (e.g., mobile device 104) does not have MBSFN subframe availability, and the mobile device (e.g., mobile device 104) also does not have DRS availability, the control device 101 can select the pattern/configuration of 30 kHz SS block SCS, SS block on the third and fourth symbols and the 5G BS device must have a minimum of 10 MHz.

FIG. 16 shows a number of different combinations of LTE and 5G (which is indicated as "gNB") features and corresponding 5G SS block configuration specifications.

Figure 17:
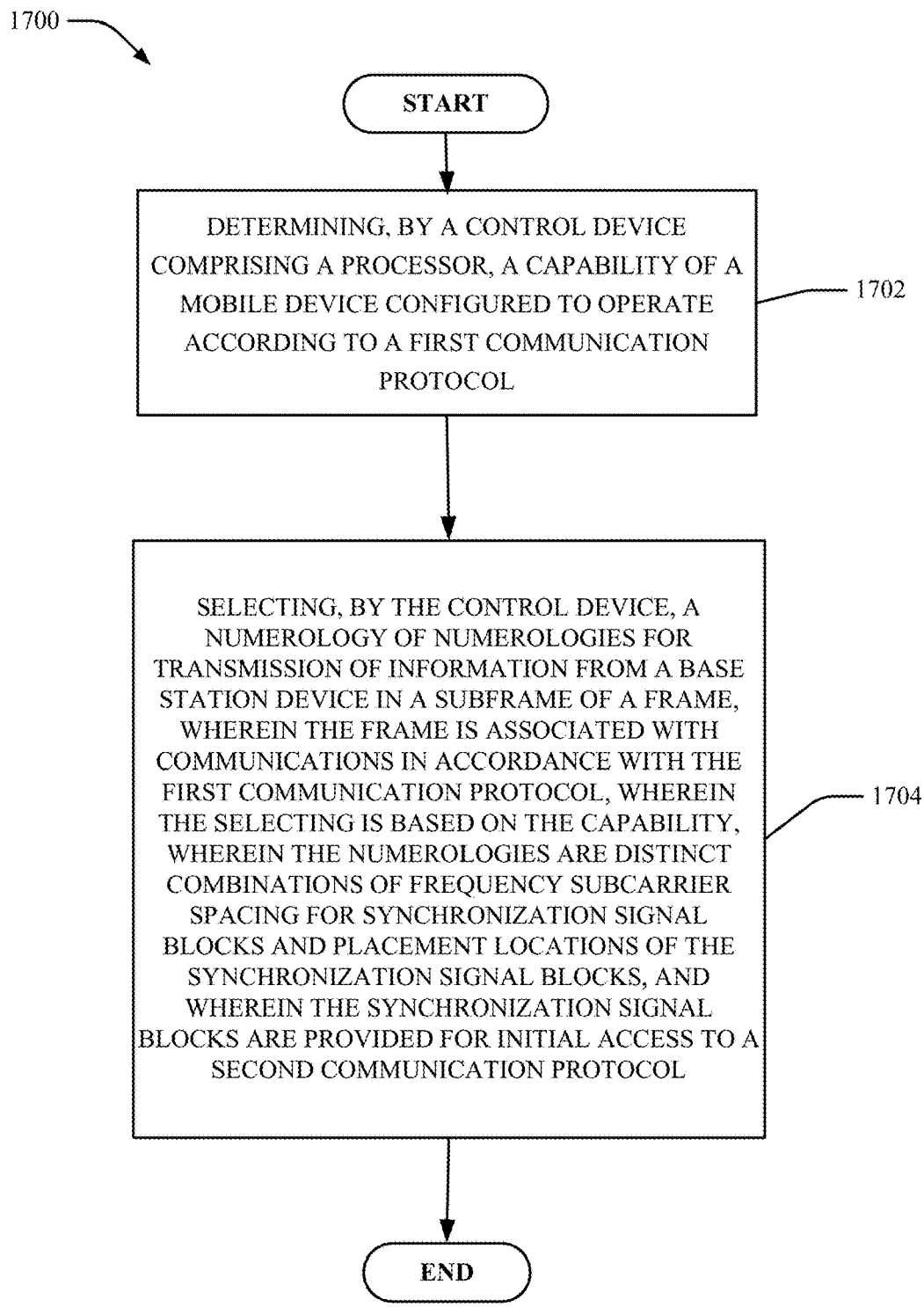
FIGS. 17-19 illustrates an example, non-limiting flowchart of a method that facilitates initial access configuration for coexistence of multiple wireless communication systems in accordance with one or more embodiments described herein
Figure 18:
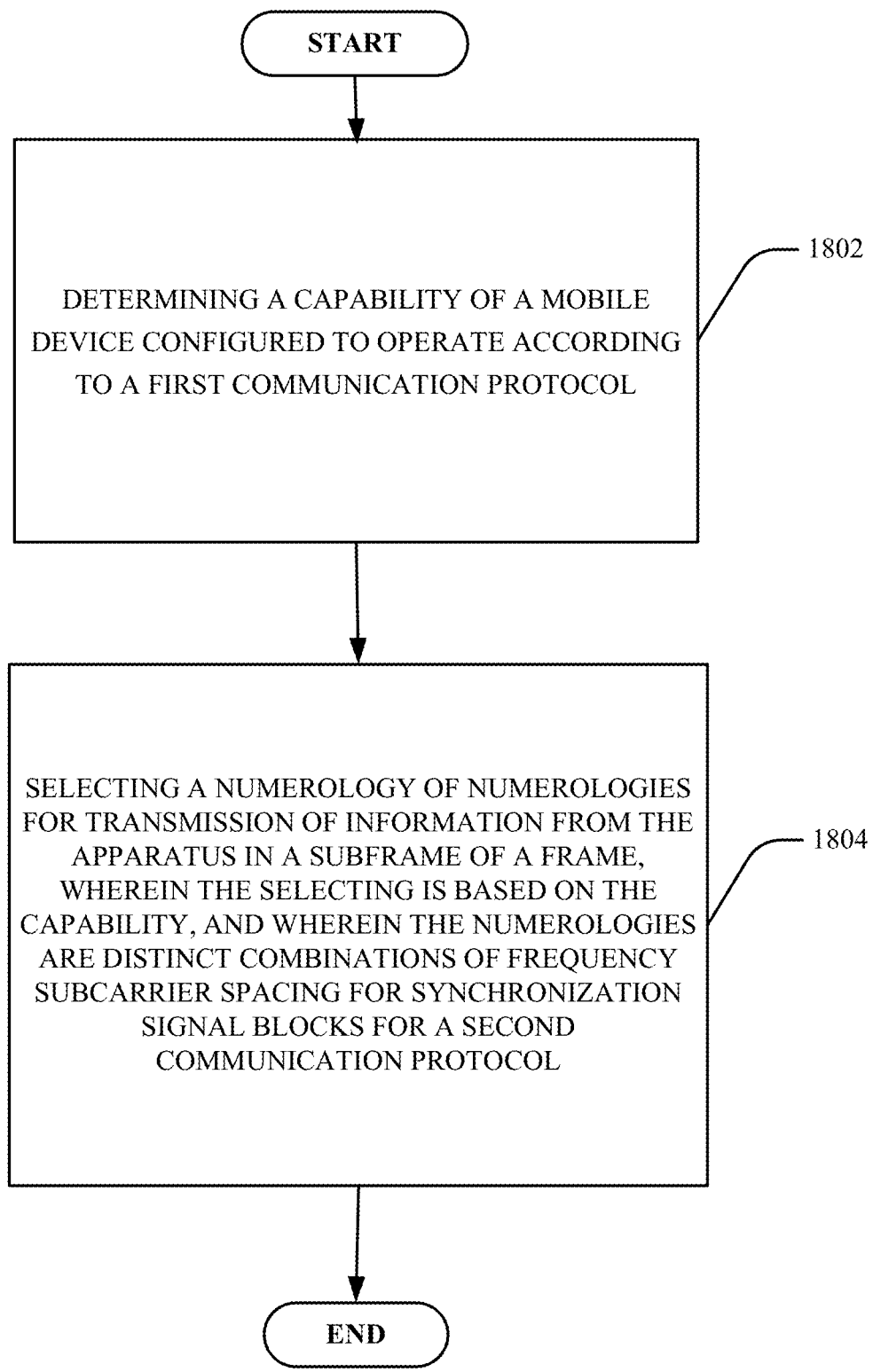
Figure 19:
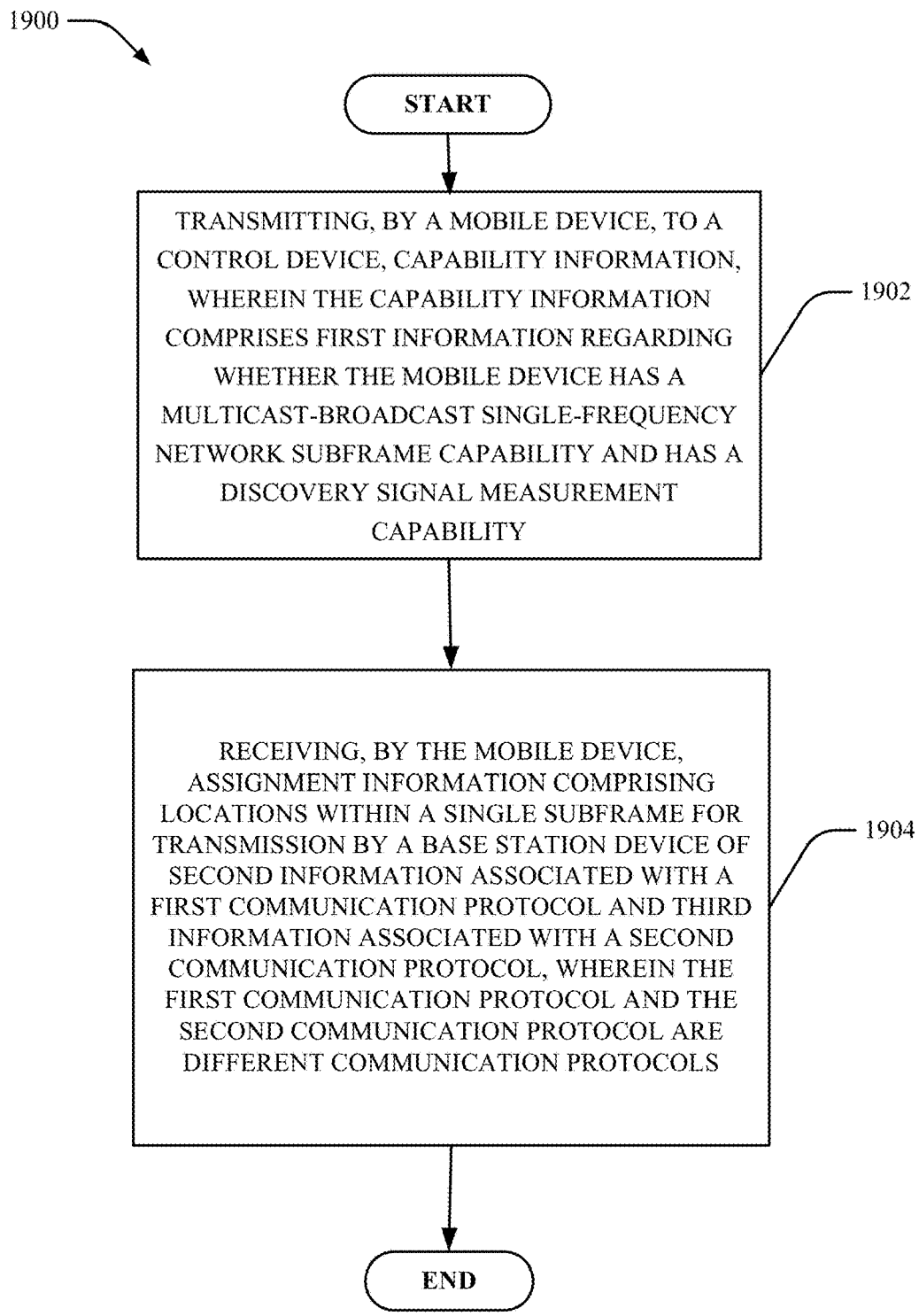

FIGS. 17-19 illustrates an example, non-limiting flowchart of a method that facilitates initial access configuration for coexistence of multiple wireless communication systems in accordance with one or more embodiments described herein.

Turning first to FIG. 17, at 1702, method 1700 can comprise determining, by a control device comprising a processor, a capability of a mobile device configured to operate according to a first communication protocol. At 1704, method 1700 can comprise selecting, by the control device, a numerology of numerologies for transmission of information from a base station device in a subframe of a frame, wherein the frame is associated with communications in accordance with the first communication protocol, wherein the selecting is based on the capability, wherein the numerologies are distinct combinations of frequency subcarrier spacing for synchronization signal blocks and placement locations of the synchronization signal blocks, and wherein the synchronization signal blocks are provided for initial access to a second communication protocol.

In some embodiments, the determining the capability of the mobile device comprises determining that the mobile device comprises a multicast-broadcast single-frequency network subframe capability. In some embodiments, the determining the capability of the mobile device further comprises determining that the mobile device comprises a discovery signal measurement capability.

In some embodiments, the determining the capability of the mobile device comprises determining that the mobile device does not comprise a multicast-broadcast single-frequency network subframe capability and does not comprise a discovery signal measurement capability, and wherein the numerology comprises a first numerology, or wherein the determining the capability of the mobile device comprises determining the mobile device comprises a multicast-broadcast single-frequency network subframe capability and does not comprise a discovery signal measurement capability, and wherein the numerology selected comprises a second numerology distinct from the first numerology.

In some embodiments, the first numerology comprises 30 kilohertz synchronization signal block spacing, wherein the synchronization signal block is located on third and fourth symbols of the slot, and wherein a minimum bandwidth for the system is 10 megahertz. In some embodiments, the second numerology comprises 15 kilohertz synchronization signal block spacing and wherein a minimum bandwidth for the system is 5 megahertz.

In some embodiments, the determining the capability of the mobile device comprises determining that the mobile device does not comprise a multicast-broadcast single-frequency network subframe capability and that the mobile device does comprise a discovery signal measurement capability, and wherein the numerology selected comprises a first numerology, or wherein the determining the capability of the mobile device comprises determining that the mobile device does not comprise a multicast-broadcast single-frequency network subframe capability and does comprise a discovery signal measurement capability, wherein the numerology selected comprises a second numerology, and wherein the first numerology is distinct from the second numerology.

In some embodiments, the first numerology 30 kilohertz synchronization signal block spacing, wherein the synchronization signal block is located on symbols of the subframe not containing cell specific reference signals, and wherein a minimum bandwidth for the system is 10 megahertz. The second numerology comprises 15 kilohertz synchronization signal block spacing, and wherein a minimum bandwidth for the system is 5 megahertz.

Turning now to FIG. 18, at 1802, method 1800 can comprise determining a capability of a mobile device configured to operate according to a first communication protocol. At 1804, method 1800 can comprise selecting a numerology of numerologies for transmission of information from the apparatus in a subframe of a frame, wherein the selecting is based on the capability, and wherein the numerologies are distinct combinations of frequency subcarrier spacing for synchronization signal blocks for a second communication protocol.

In some embodiments, the determining the capability of the mobile device comprises determining that the mobile device comprises a multicast-broadcast single-frequency network subframe capability and a discovery signal measurement capability. In some embodiments, the determining the capability of the mobile device comprises determining that the mobile device does not comprise a multicast-broadcast single-frequency network subframe capability and does not comprise a discovery signal measurement capability, and wherein the numerology comprises a first numerology, or wherein the determining the capability of the mobile device comprises determining the mobile device comprises a multicast-broadcast single-frequency network subframe capability and does not comprise a discovery signal measurement capability, and wherein the numerology selected comprises a second numerology distinct from the first numerology.

In some embodiments, the determining the capability of the mobile device comprises determining that the mobile device does not comprise a multicast-broadcast single-frequency network subframe capability and that the mobile device does comprise a discovery signal measurement capability, and wherein the numerology selected comprises a first numerology, or wherein the determining the capability of the mobile device comprises determining that the mobile device does not comprise a multicast-broadcast single-frequency network subframe capability and does comprise a discovery signal measurement capability, wherein the numerology selected comprises a second numerology, and wherein the first numerology is distinct from the second numerology.

In some embodiments, the first numerology comprises a first defined frequency subcarrier spacing for the synchronization signal block, wherein the synchronization signal block is located on first defined symbols of the subframe of a frame, and wherein a BW for the transmission of the subframe comprises at least a first defined amount of BW. In some embodiments, the second numerology comprises a second defined frequency subcarrier spacing for the synchronization signal block, and wherein the BW for the transmission of the subframe comprises at least a second defined amount of BW.

In some embodiments, the first numerology comprises a first defined frequency subcarrier spacing for the synchronization signal block, wherein the synchronization signal block is located on symbols of the subframe not containing cell specific reference signals (CRS), and wherein a bandwidth for the transmission of the subframe comprises at least a first defined amount of BW. In some embodiments, the second numerology comprises the second defined frequency subcarrier spacing for the synchronization signal block, and wherein the BW for the transmission of the subframe comprises at least a second defined amount of BW.

Turning now to FIG. 19, at 1902, method 1900 can comprise transmitting, by a mobile device, to a control device, capability information, wherein the capability information comprises first information regarding whether the mobile device has a multicast-broadcast single-frequency network subframe capability and has a discovery signal measurement capability. At 1904, method 1900 can comprise receiving, by the mobile device, assignment information determined based on the capability information and comprising locations within a single subframe for transmission by a base station device of second information associated with a first communication protocol and third information associated with a second communication protocol, wherein the first communication protocol and the second communication protocol are different communication protocols.

In some embodiments, the locations are within the single subframe of a frame associated with the first communication protocol, and wherein the single subframe is time division multiplexed between transmissions of the first and second communication protocols.

In some embodiments, the locations are within the single subframe of a frame associated with the first communication protocol, and wherein the single subframe is frequency division multiplexed between transmissions of the first and second communication protocols.

Figure 20:
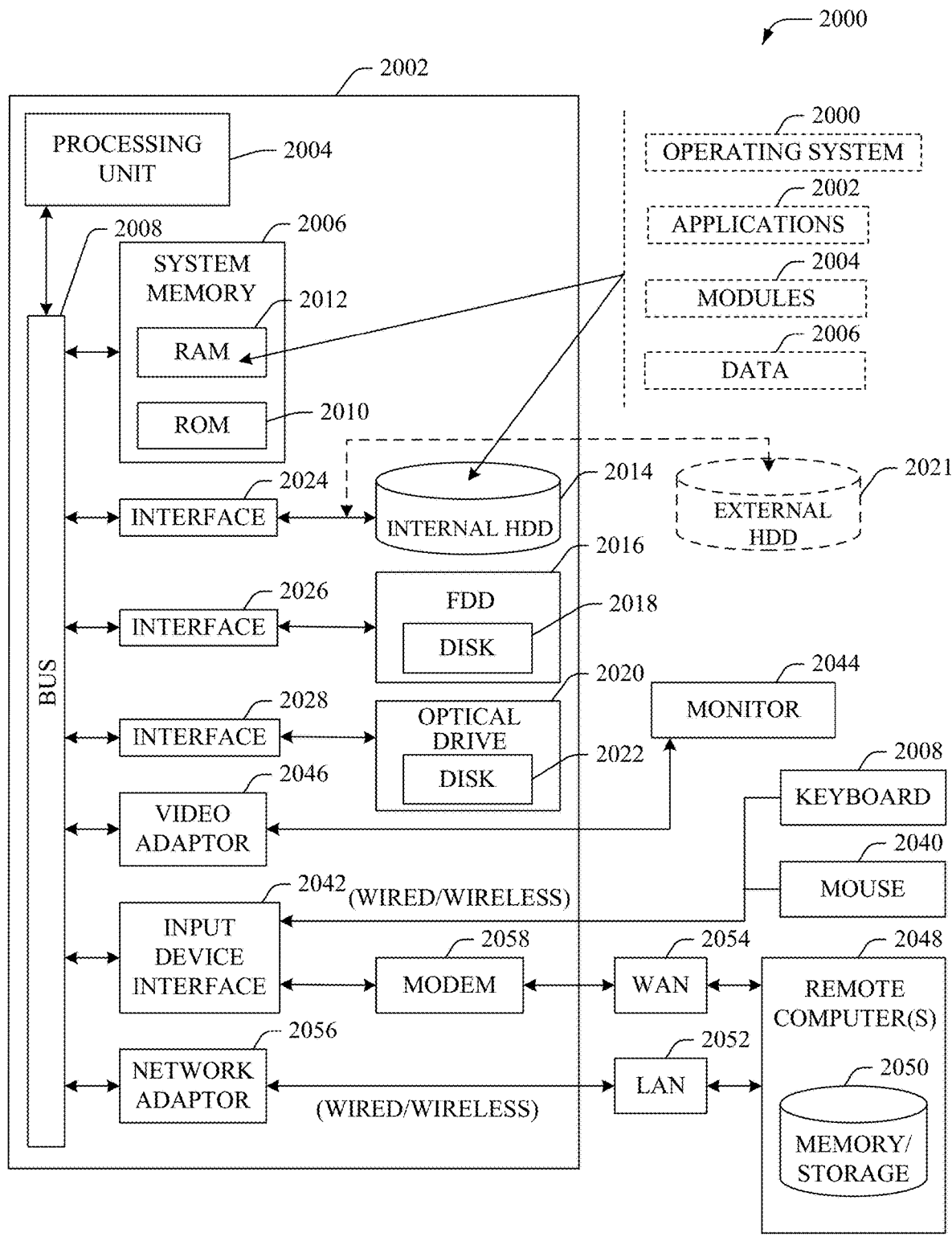
FIG. 20 illustrates a block diagram of a computer that can be employed in accordance with one or more embodiments described herein.

FIG. 20 illustrates a block diagram of a computer that can be employed in accordance with one or more embodiments. Repetitive description of like elements employed in other embodiments described herein is omitted for sake of brevity.

In some embodiments, the computer, or a component of the computer, can be or be comprised within any number of components described herein comprising, but not limited to, base station device 102 or mobile device 104 (or a component of base station device 102 or mobile device 104). In order to provide additional text for various embodiments described herein, FIG. 20 and the following discussion are intended to provide a brief, general description of a suitable computing environment 2000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules comprise routines, programs, components, data structures, etc., that perform particular tasks or implement particular abstract data types. Moreover, those skilled in the art will appreciate that the inventive methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable (or machine-readable) storage media and/or communications media, which two terms are used herein differently from one another as follows. Computer-readable (or machine-readable) storage media can be any available storage media that can be accessed by the computer (or a machine, device or apparatus) and comprises both volatile and nonvolatile media, removable and non-removable media. By way of example, and not limitation, computer-readable (or machine-readable) storage media can be implemented in connection with any method or technology for storage of information such as computer-readable (or machine-readable) instructions, program modules, structured data or unstructured data. Tangible and/or non-transitory computer-readable (or machine-readable) storage media can comprise, but are not limited to, random access memory (RAM), read only memory (ROM), electrically erasable programmable read only memory (EEPROM), flash memory or other memory technology, solid state drive (SSD) or other solid-state storage technology, compact disk read only memory (CD-ROM), digital versatile disk (DVD), Blu-ray disc or other optical disk storage, magnetic cassettes, magnetic tape, magnetic disk storage, other magnetic storage devices and/or other media that can be used to store desired information. Computer-readable (or machine-readable) storage media can be accessed by one or more local or remote computing devices, e.g., via access requests, queries or other data retrieval protocols, for a variety of operations with respect to the information stored by the medium.

In this regard, the term "tangible" herein as applied to storage, memory or computer-readable (or machine-readable) media, is to be understood to exclude only propagating intangible signals per se as a modifier and does not relinquish coverage of all standard storage, memory or computer-readable (or machine-readable) media that are not only propagating intangible signals per se.

In this regard, the term "non-transitory" herein as applied to storage, memory or computer-readable (or machine-readable) media, is to be understood to exclude only propagating transitory signals per se as a modifier and does not relinquish coverage of all standard storage, memory or computer-readable (or machine-readable) media that are not only propagating transitory signals per se.

Communications media typically embody computer-readable (or machine-readable) instructions, data structures, program modules or other structured or unstructured data in a data signal such as a modulated data signal, e.g., a channel wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 20, the example environment 2000 for implementing various embodiments of the embodiments described herein comprises a computer 2002, the computer 2002 comprising a processing unit 2004, a system memory 2006 and a system bus 2008. The system bus 2008 couples system components comprising, but not limited to, the system memory 2006 to the processing unit 2004. The processing unit 2004 can be any of various commercially available processors. Dual microprocessors and other multi-processor architectures can also be employed as the processing unit 2004.

The system bus 2008 can be any of several types of bus structure that can further interconnect to a memory bus (with or without a memory controller), a peripheral bus, and a local bus using any of a variety of commercially available bus architectures. The system memory 2006 comprises ROM 2010 and RAM 2012. A basic input/output system (BIOS) can be stored in a non-volatile memory such as ROM, erasable programmable read only memory (EPROM), EEPROM, which BIOS contains the basic routines that help to transfer information between elements within the computer 2002, such as during startup. The RAM 2012 can also comprise a high-speed RAM such as static RAM for caching data.

The computer 2002 further comprises an internal hard disk drive (HDD) 2010 (e.g., EIDE, SATA), which internal hard disk drive 2014 can also be configured for external use in a suitable chassis (not shown), a magnetic floppy disk drive 2016, (e.g., to read from or write to a removable diskette 2018) and an optical disk drive 2020, (e.g., reading a CD-ROM disk 2022 or, to read from or write to other high capacity optical media such as the DVD). The hard disk drive 2014, magnetic disk drive 2016 and optical disk drive 2020 can be connected to the system bus 2008 by a hard disk drive interface 2024, a magnetic disk drive interface 2026 and an optical drive interface, respectively. The interface 2024 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable (or machine-readable) storage media provide nonvolatile storage of data, data structures, computer-executable instructions, and so forth. For the computer 2002, the drives and storage media accommodate the storage of any data in a suitable digital format. Although the description of computer-readable (or machine-readable) storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 2012, comprising an operating system 2030, one or more application programs 2032, other program modules 2034 and program data 2036. All or portions of the operating system, applications, modules, and/or data can also be cached in the RAM 2012. The systems and methods described herein can be implemented utilizing various commercially available operating systems or combinations of operating systems.

A communication device can enter commands and information into the computer 2002 through one or more wired/wireless input devices, e.g., a keyboard 2038 and a pointing device, such as a mouse 2040. Other input devices (not shown) can comprise a microphone, an infrared (IR) remote control, a joystick, a game pad, a stylus pen, touch screen or the like. These and other input devices are often connected to the processing unit 2004 through an input device interface 2042 that can be coupled to the system bus 2008, but can be connected by other interfaces, such as a parallel port, an IEEE 1394 serial port, a game port, a universal serial bus (USB) port, an IR interface, etc.

A monitor 2044 or other type of display device can be also connected to the system bus 2008 via an interface, such as a video adapter 2046. In addition to the monitor 2044, a computer typically comprises other peripheral output devices (not shown), such as speakers, printers, etc.

The computer 2002 can operate in a networked environment using logical connections via wired and/or wireless communications to one or more remote computers, such as a remote computer(s) 2048. The remote computer(s) 2048 can be a workstation, a server computer, a router, a personal computer, portable computer, microprocessor-based entertainment appliance, a peer device or other common network node, and typically comprises many or all of the elements described relative to the computer 2002, although, for purposes of brevity, only a memory/storage device 2050 is illustrated. The logical connections depicted comprise wired/wireless connectivity to a local area network (LAN) 2052 and/or larger networks, e.g., a wide area network (WAN) 2054. Such LAN and WAN networking environments are commonplace in offices and companies, and facilitate enterprise-wide computer networks, such as intranets, all of which can connect to a global communications network, e.g., the Internet.

When used in a LAN networking environment, the computer 2002 can be connected to the local network 2052 through a wired and/or wireless communication network interface or adapter 2056. The adapter 2056 can facilitate wired or wireless communication to the LAN 2052, which can also comprise a wireless AP disposed thereon for communicating with the wireless adapter 2056.

When used in a WAN networking environment, the computer 2002 can comprise a modem 2058 or can be connected to a communications server on the WAN 2054 or has other means for establishing communications over the WAN 2054, such as by way of the Internet. The modem 2058, which can be internal or external and a wired or wireless device, can be connected to the system bus 2008 via the input device interface 2042. In a networked environment, program modules depicted relative to the computer 2002 or portions thereof, can be stored in the remote memory/storage device 2050. It will be appreciated that the network connections shown are example and other means of establishing a communications link between the computers can be used.

The computer 2002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a defined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a femto cell device. Wi-Fi networks use radio technologies called IEEE 802.11 (a, b, g, n, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands, at an 11 Mbps (802.11a) or 54 Mbps (802.11b) data rate, for example or with products that contain both bands (dual band), so the networks can provide real-world performance similar to the basic 10 Base T wired Ethernet networks used in many offices.

The embodiments described herein can employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of an acquired network. A classifier is a function that maps an input attribute vector, $x=(x1, x2, x3, x4, \ldots, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that a communication device desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing communication device behavior, operator preferences, historical information, receiving extrinsic information). For example, SVMs can be configured via a learning or training phase within a classifier constructor and feature selection module. Thus, the classifier(s) can be used to automatically learn and perform a number of functions, comprising but not limited to determining according to a predetermined criteria which of the acquired cell sites will benefit a maximum number of subscribers and/or which of the acquired cell sites will add minimum value to the existing communication network coverage, etc.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of communication device equipment. A processor can also be implemented as a combination of computing processing units.

As used herein, terms such as "data storage," "database," and substantially any other information storage component relevant to operation and functionality of a component, refer to "memory components," or entities embodied in a "memory" or components comprising the memory. It will be appreciated that the memory components or computer-readable (or machine-readable) storage media, described herein can be either volatile memory or nonvolatile memory or can comprise both volatile and nonvolatile memory.

Memory disclosed herein can comprise volatile memory or nonvolatile memory or can comprise both volatile and nonvolatile memory. By way of illustration, and not limitation, nonvolatile memory can comprise read only memory (ROM), programmable ROM (PROM), electrically programmable ROM (EPROM), electrically erasable PROM (EEPROM) or flash memory. Volatile memory can comprise random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory (e.g., data storages, databases) of the embodiments are intended to comprise, without being limited to, these and any other suitable types of memory.

What has been described above comprises mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "comprises" is used in either the detailed description or the claims, such term is intended to be inclusive in a manner similar to the term "comprising" as "comprising" is interpreted when employed as a transitional word in a claim.

What is claimed is:

1. A method, comprising:
   determining, by a control system comprising a processor, a capability of a device configured to operate according to a first communication protocol;
   selecting, by the control system, a numerology of a group of numerologies for transmission of information from a base station device in a subframe of a frame, wherein the group of numerologies comprises at least four different configurations of synchronization signal block spacing, synchronization signal block bandwidth and synchronization signal block duration, wherein the frame is associated with communications in accordance with the first communication protocol, wherein the selecting is based on a combination of the capability of the device and a type of the subframe of the frame, wherein the numerologies of the group are distinct combinations of frequency subcarrier spacing for synchronization signal blocks provided for initial access to usage of a second communication protocol and placement locations of the synchronization signal blocks and wherein the type of the subframe is identified from a group of types of subframes indicating that the subframe is a downlink subframe, indicating whether the device comprises a multicast-broadcast single-frequency network subframe capability, and indicating whether the device comprises a discovery signal measurement capability that enables fast Long Term Evolution SCell activation and deactivation.

2. The method of claim 1, wherein determining the capability of the device comprises determining that the device comprises the multicast-broadcast single-frequency network subframe capability.

3. The method of claim 2, wherein determining the capability of the device further comprises determining that the device comprises the discovery signal measurement capability.

4. The method of claim 1, wherein the selecting is based on making a joint determination that:

the device does not comprise the multicast-broadcast single-frequency network subframe capability and does not comprise the discovery signal measurement capability, and wherein the numerology comprises a first numerology, or the device comprises the multicast-broadcast single-frequency network subframe capability and does not comprise the discovery signal measurement capability, and wherein the numerology selected comprises a second numerology distinct from the first numerology.

5. The method of claim 4, wherein the first numerology comprises 30 kilohertz synchronization signal block spacing, wherein the synchronization signal block is located on third and fourth symbols of a slot, and wherein a minimum bandwidth for a system is 10 megahertz.

6. The method of claim 5, wherein the second numerology comprises 15 kilohertz synchronization signal block spacing, and wherein a minimum bandwidth for a system is 5 megahertz.

7. The method of claim 1, wherein the selecting is based on a joint determination that:

the device does comprise the multicast-broadcast single-frequency network subframe capability and the device does comprise the discovery signal measurement capability, and wherein the numerology selected comprises a first numerology, or the device does not comprise the multicast-broadcast single-frequency network subframe capability and does comprise the discovery signal measurement capability, wherein the numerology selected comprises a second numerology, and wherein the first numerology is distinct from the second numerology.

8. The method of claim 7, wherein the first numerology comprises 30 kilohertz synchronization signal block spacing, wherein the synchronization signal block is located on symbols of the subframe not containing cell specific reference signals, and wherein a minimum bandwidth for a system is 10 megahertz.

9. The method of claim 8, wherein the second numerology comprises 15 kilohertz synchronization signal block spacing, and wherein a minimum bandwidth for a system is 5 megahertz.

10. An apparatus, comprising:
a processor; and
a memory that stores executable instructions that, when executed by the processor, facilitate performance of operations, comprising:
determining a capability of a mobile device configured to operate according to a first communication protocol, wherein the capability of the mobile device is received by the apparatus from the mobile device; and
selecting a numerology, from numerologies, for transmission of information from the apparatus in a subframe of a frame, wherein the selecting is based on a combination of the capability of the mobile device indicating whether the mobile device comprises a multicast-broadcast single-frequency network subframe capability and indicating whether the mobile device comprises a discovery signal measurement capability that enables fast Long Term Evolution SCell activation and deactivation, and further based on bandwidth enabled via the apparatus, and wherein the numerologies are distinct combinations of frequency subcarrier spacing for synchronization signal blocks for a second communication protocol.

11. The apparatus of claim 10, wherein the determining comprises determining that the mobile device comprises a multicast-broadcast single-frequency network subframe capability and a discovery signal measurement capability.

12. The apparatus of claim 10, wherein the selecting is based on a joint determination that: the mobile device does not comprise the multicast-broadcast single-frequency network subframe capability and does not comprise the discovery signal measurement capability, and wherein the numerology comprises a first numerology, or the mobile device comprises the multicast-broadcast single-frequency network subframe capability and does not comprise the discovery signal measurement capability, and wherein the numerology selected comprises a second numerology distinct from the first numerology.

13. The apparatus of claim 10, wherein the selecting is based on a joint determination that: the mobile device does comprise the multicast-broadcast single-frequency network subframe capability and that the mobile device does comprise the discovery signal measurement capability, and wherein the numerology selected comprises a first numerology, or the mobile device does not comprise the multicast-broadcast single-frequency network subframe capability and does comprise the discovery signal measurement capability, wherein the numerology selected comprises a second numerology, and wherein the first numerology is distinct from the second numerology.

14. The apparatus of claim 12, wherein the first numerology comprises a first defined frequency subcarrier spacing for the synchronization signal block, wherein the synchronization signal block is located on first defined symbols of the subframe of a frame, and wherein a bandwidth for the transmission of the subframe comprises at least a first defined amount of bandwidth.

15. The apparatus of claim 14, wherein the second numerology comprises a second defined frequency subcarrier spacing for the synchronization signal block, and wherein the bandwidth for the transmission of the subframe comprises at least a second defined amount of bandwidth.

16. The apparatus of claim 13, wherein the first numerology comprises a first defined frequency subcarrier spacing for the synchronization signal block, wherein the synchronization signal block is located on symbols of the subframe not containing cell specific reference signals (CRS), and wherein a bandwidth for the transmission of the subframe comprises at least a first defined amount of bandwidth.

17. The apparatus of claim 16, wherein the second numerology comprises a second defined frequency subcarrier spacing for the synchronization signal block, and wherein the bandwidth for the transmission of the subframe comprises at least a second defined amount of bandwidth.

18. A non-transitory machine-readable medium, comprising executable instructions that, when executed by a processor of a user equipment, facilitate performance of operations, comprising:

transmitting, to a network equipment, capability information, wherein the capability information is associated with a numerology selected by the network equipment from a group of at least four numerologies based on a combination of whether the user equipment has a multicast-broadcast single-frequency network subframe capability and whether the user equipment has a discovery signal measurement capability that enables fast Long Term Evolution SCell activation and deactivation; and receiving assignment information determined based on the capability information and based on a bandwidth associated with the network equipment, and the assignment information comprising locations within a single subframe for transmission of second information associated with a first communication protocol and third information associated with a second communication protocol, wherein the first communication protocol and the second communication protocol are different communication protocols.

19. The non-transitory machine-readable medium of claim 18, wherein the locations are within the single subframe of a frame associated with the first communication protocol, and wherein the single subframe is time division multiplexed between transmissions of the first communication protocol and the second communication protocol.

20. The non-transitory machine-readable medium of claim 18, wherein the locations are within the single subframe of a frame associated with the first communication protocol, and wherein the single subframe is frequency division multiplexed between transmissions of the first communication protocol and the second communication protocol.

* * * * *